(12) United States Patent
Kursun et al.

(10) Patent No.: US 9,721,175 B2
(45) Date of Patent: Aug. 1, 2017

(54) SYSTEMS AND METHODS FOR HIGH FIDELITY MULTI-MODAL OUT-OF-BAND BIOMETRIC AUTHENTICATION THROUGH VECTOR-BASED MULTI-PROFILE STORAGE

(71) Applicant: JPMorgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 229 days.

(21) Appl. No.: 13/940,799

(22) Filed: Jul. 12, 2013

(65) Prior Publication Data

US 2014/0333414 A1    Nov. 13, 2014

Related U.S. Application Data

(63) Continuation-in-part of application No. 13/908,618, filed on Jun. 3, 2013.
(Continued)

(51) Int. Cl.
*G05B 19/00* (2006.01)
*G06K 9/00* (2006.01)

(52) U.S. Cl.
CPC .............................. *G06K 9/00926* (2013.01)

(58) Field of Classification Search
CPC .. G06K 9/00; G06K 9/00221; G06K 9/00228; G06K 9/00248; G06K 9/00268;
(Continued)

(56) References Cited

U.S. PATENT DOCUMENTS 5,072,294 A    12/1991 Engle
5,648,648 A    7/1997 Chou
(Continued)

FOREIGN PATENT DOCUMENTS

EP    2560123    2/2013
WO    WO 2008/055181    5/2008
(Continued)

OTHER PUBLICATIONS

Notification of Transmittal of The International Search Report and The Written Opinion of the International Searching Authority, or the Declaration, Dec. 9, 2014.
(Continued)

*Primary Examiner* — Ryan Sherwin
(74) *Attorney, Agent, or Firm* — Hunton & Williams LLP

(57) ABSTRACT

A method for generating multiple biometric profiles for a user is disclosed. According to one embodiment, the method may include (1) receiving data from a user, the data comprising biometric data for a user and device specifications for the electronic device; (2) at least one computer processor retrieving at least one existing user profile; (3) the at least one computer processor determining whether the data is consistent with at least one of the existing profiles; and (4) the at least one computer processor updating at least one existing profile if the data is consistent with the existing profile.

22 Claims, 18 Drawing Sheets

Related U.S. Application Data

(60) Provisional application No. 61/844,097, filed on Jul. 9, 2013, provisional application No. 61/820,917, filed on May 8, 2013, provisional application No. 61/823,669, filed on May 15, 2013.

(58) Field of Classification Search
CPC ......... G06K 9/00281; G06K 9/00288; G06K 9/00885; G06K 9/00892; G06K 9/00926; G06K 9/00993; G06F 21/31; G06F 21/32; G06F 17/30035; G06Q 20/40145
See application file for complete search history.

(56) References Cited

U.S. PATENT DOCUMENTS

| | | | |
|---|---|---|---|
| 5,679,940 A | | 10/1997 | Templeton et al. |
| 6,532,459 B1 * | | 3/2003 | Berson |
| 6,697,942 B1 | | 2/2004 | L'Heureux et al. |
| 7,174,323 B1 | | 2/2007 | Schultz et al. |
| 7,330,570 B2 * | | 2/2008 | Sogo ................. G06K 9/00288 340/5.52 |
| 7,360,239 B2 * | | 4/2008 | Mandalia et al. ................ 726/5 |
| 7,454,470 B1 | | 11/2008 | Isaacs |
| 8,065,175 B1 | | 11/2011 | Lewis |
| 8,191,126 B2 | | 5/2012 | Raghavan |
| 8,606,611 B1 | | 12/2013 | Fedorov |
| 8,724,910 B1 * | | 5/2014 | Pillai ................. G06K 9/00288 382/225 |
| 8,892,461 B2 * | | 11/2014 | Lau et al. ................. 705/14.66 |
| 9,280,715 B2 * | | 3/2016 | Stephanson ........ G06K 9/00892 |
| 2001/0036300 A1 | | 11/2001 | Xia |
| 2002/0140542 A1 | | 10/2002 | Prokoski |
| 2002/0174344 A1 * | | 11/2002 | Ting ........................ G06F 21/32 713/185 |
| 2002/0180586 A1 * | | 12/2002 | Kitson et al. ................ 340/5.82 |
| 2002/0198731 A1 | | 12/2002 | Barnes |
| 2003/0031348 A1 * | | 2/2003 | Kuepper et al. ............. 382/116 |
| 2003/0046228 A1 | | 3/2003 | Berney |
| 2003/0210808 A1 * | | 11/2003 | Chen .................. G06K 9/00221 382/118 |
| 2004/0098481 A1 | | 5/2004 | Gunji |
| 2004/0104266 A1 | | 6/2004 | Bolle |
| 2004/0228504 A1 * | | 11/2004 | Chang ................ G06K 9/00288 382/118 |
| 2005/0018883 A1 | | 1/2005 | Scott |
| 2005/0138391 A1 | | 6/2005 | Mandalia |
| 2005/0144560 A1 | | 6/2005 | Gruen |
| 2006/0010217 A1 | | 1/2006 | Sood |
| 2006/0227997 A1 * | | 10/2006 | Au et al. ....................... 382/103 |
| 2006/0248344 A1 | | 11/2006 | Yang |
| 2006/0251338 A1 * | | 11/2006 | Gokturk ........... G06F 17/30253 382/305 |
| 2006/0259778 A1 | | 11/2006 | Gudorf |
| 2007/0283142 A1 | | 12/2007 | Milstein et al. |
| 2008/0077660 A1 | | 3/2008 | Tomida |
| 2008/0089561 A1 * | | 4/2008 | Zhang ............... G06F 17/30259 382/118 |
| 2008/0126951 A1 | | 5/2008 | Sood et al. |
| 2008/0253622 A1 * | | 10/2008 | Tosa et al. ..................... 382/117 |
| 2008/0302870 A1 | | 12/2008 | Berini |
| 2009/0182822 A1 | | 7/2009 | O'Sullivan |
| 2009/0222913 A1 | | 9/2009 | Fujii |
| 2009/0252383 A1 * | | 10/2009 | Adam et al. .................. 382/118 |
| 2009/0265106 A1 | | 10/2009 | Bearman |
| 2010/0011428 A1 | | 1/2010 | Atwood |
| 2010/0030798 A1 | | 2/2010 | Kumar et al. |
| 2010/0067745 A1 * | | 3/2010 | Kovtun et al. ................ 382/106 |
| 2010/0169958 A1 | | 7/2010 | Werner et al. |
| 2010/0251359 A1 | | 9/2010 | Shirai et al. |
| 2010/0287382 A1 | | 11/2010 | Gyorffy et al. |
| 2010/0321156 A1 | | 12/2010 | Pitt |
| 2011/0072039 A1 | | 3/2011 | Tayloe |
| 2011/0072510 A1 | | 3/2011 | Cheswick |
| 2011/0178962 A1 | | 7/2011 | Sood |
| 2011/0208716 A1 | | 8/2011 | Liu et al. |
| 2012/0023574 A1 | | 1/2012 | Osborn et al. |
| 2012/0068820 A1 | | 3/2012 | Millicone |
| 2012/0151377 A1 | | 6/2012 | Schultz et al. |
| 2012/0157042 A1 | | 6/2012 | McCanna |
| 2012/0158798 A1 | | 6/2012 | Patil |
| 2012/0167199 A1 | | 6/2012 | Riddiford |
| 2012/0169461 A1 | | 7/2012 | Dubois, Jr. |
| 2012/0204035 A1 | | 8/2012 | Camenisch et al. |
| 2012/0255995 A1 | | 10/2012 | Ahmed |
| 2012/0291120 A1 | | 11/2012 | Griffin |
| 2012/0319817 A1 | | 12/2012 | Abe |
| 2013/0055362 A1 | | 2/2013 | Rathbun |
| 2013/0117059 A1 | | 5/2013 | Norton et al. |
| 2013/0262333 A1 | | 10/2013 | Wicker |
| 2013/0268775 A1 | | 10/2013 | Hawkins |
| 2013/0340061 A1 * | | 12/2013 | Tsukamoto ............. G06F 21/32 726/7 |
| 2013/0346067 A1 | | 12/2013 | Bhatt |
| 2014/0002238 A1 | | 1/2014 | Taveau |
| 2014/0007185 A1 | | 1/2014 | Han et al. |
| 2014/0096196 A1 | | 4/2014 | O'Connor |
| 2014/0137221 A1 | | 5/2014 | Dominic et al. |
| 2014/0181956 A1 | | 6/2014 | Ahn et al. |
| 2014/0270404 A1 * | | 9/2014 | Hanna ................ G06Q 30/0609 382/116 |
| 2014/0347479 A1 * | | 11/2014 | Givon ........................... 348/143 |
| 2014/0363058 A1 | | 12/2014 | Emmett |
| 2015/0039527 A1 | | 2/2015 | Hanna |
| 2015/0200899 A1 | | 7/2015 | Sanketi |

FOREIGN PATENT DOCUMENTS

| | | |
|---|---|---|
| WO | WO 2009/067738 | 6/2009 |
| WO | WO 2012/164385 | 12/2012 |
| WO | WO 2012173655 | 12/2012 |

OTHER PUBLICATIONS

International Search Report, Dec. 9, 2014.
Written Opinion of the International Searching Authority, Dec. 9, 2014.
PCT International Preliminary Examination Report on Patentability, International Application No. PCT/US2014/048822, Feb. 11, 2016, pp. 1-8.
European Patent Office Communication and Supplementary European Search Report, European Patent Application No. 14794941.6, Nov. 18, 2016, pp. 1-8.

* cited by examiner

SYSTEMS AND METHODS FOR HIGH FIDELITY MULTI-MODAL OUT-OF-BAND BIOMETRIC AUTHENTICATION THROUGH VECTOR-BASED MULTI-PROFILE STORAGE

RELATED APPLICATIONS

This patent application is a continuation-in-part of U.S. patent application Ser. No. 13/908,618, filed Jun. 3, 2013. It claims priority to U.S. Provisional Patent Application Ser. No. 61/844,097, filed Jul. 9, 2013; U.S. Provisional Patent Application Ser. No. 61/820,917, filed May 8, 2013, and U.S. Provisional Patent Application Ser. No. 61/823,669, filed May 15, 2013. The disclosure of each of these patent applications is hereby incorporated, by reference, in its entirety.

BACKGROUND OF THE INVENTION

1. Field of the Invention

The present invention generally relates to biometric authentication and, more particularly, to systems and methods for high fidelity multi-modal out-of-band biometric authentication.

2. Description of the Related Art

To access a company network or website, users generally enter a user name and password. A similar approach may be used when a user attempts to access an on-line account that the user may have with, for example, a financial institution, service/utility provider, etc.

SUMMARY OF THE INVENTION

Systems and methods for high fidelity multi-modal out-of-band biometric authentication are disclosed.

According to one embodiment, a method for multi-mode biometric authentication may include (1) receiving, at a computer application executed by an electronic device, a first input from a first input device on the electronic device; (2) receiving, at the computer application, a second data from a second input device on the electronic device; (3) receiving, at the computer application, a third input from a third input device on the electronic device; and (4) communicating, by the computer application and to a server, the first input, the second input, and the third input. The first input, second input and third input may be received within a predetermined time period, such as five seconds.

In one embodiment, the electronic device may be a mobile electronic device, and the computer application may be a mobile application. In one embodiment, the first input device may be a first camera, and the first input may be a machine-readable code, such as a QR code.

In one embodiment, the second input device may be a second camera, and the second input may be an image of at least a part of a user. The image of the user may include at least one of the user's eyes, irises, etc. In another embodiment, the image of the user may include the user's face.

In one embodiment, the third input device may be a microphone, and the third input may be a voice biometric. In another embodiment, the third input device may be touch-sensitive, and the third input may be touch-based biometric, such as a finger biometric.

In one embodiment, the third input may be a behavioral biometric.

In one embodiment, the third input may be a thermal biometric.

In one embodiment, the first input, the second input, and the third input may be received in response to a user attempting to access a website.

In another embodiment, the first input, the second input, and the third input may be received in response to a user attempting to conduct a transaction. In one embodiment, the transaction may have a value above a predetermined value. In another embodiment, transaction may have a risk level above a predetermined risk level.

In one embodiment, the first input, the second input, and the third input may be received in response to a user launching a second computer application.

In another embodiment, a method for multi-mode biometric authentication is disclosed. The method may include (1) receiving, at a computer application executed by an electronic device, an image of at least a portion of a user at a first camera on the electronic device; (2) displaying, on a touch screen of the electronic device, the image of at least a portion of the user; (3) receiving, at the electronic application, touch data on the image of at least a portion of the user from the touch sensitive portion of the touch screen; and (4) communicating, to a server, the image of at least a portion of the user and the touch data. The image of at least a portion of the user and the touch data may be received within a predetermined time period, such as five seconds.

In one embodiment, the touch data may be related to the image of at least a portion of the user.

In one embodiment, the image of at least a portion of the user may be displayed with a plurality of markers, and the touch data may include a pattern trace among at least two of the markers.

In another embodiment, the image of at least a portion of the user may be displayed with a plurality of highlighted areas, and the touch data may include a pattern trace among at least two of the highlighted areas.

In another embodiment, the image of at least a portion of the user may be displayed with a signature area, and the touch data may include a signature of the user.

In one embodiment, the image of at least a portion of the user and the touch data may be received in response to a user attempting to access a website.

In another embodiment, the image of at least a portion of the user and the touch data may be received in response to a user attempting to conduct a transaction. In one embodiment, the transaction may have a value above a predetermined value. In another embodiment, transaction may have a risk level above a predetermined risk level.

In one embodiment, the image of at least a portion of the user and the touch data may be received in response to a user launching a second computer application.

In one embodiment, the method may further include receiving, at the computer application, a biometric from the user at an input device on the electronic device, and the biometric is communicated to the server with the image of at least a portion of the user and the touch data, and the image of at least a portion of the user, the touch data, and the biometric are received within the predetermined time period.

According to another embodiment, a method for biometric authentication is disclosed. The method may include: (1) capturing, at an electronic device, an image of an iris of a user; (2) comparing, using at least one computer processor, biometrics data from the image of the iris to stored iris biometrics data for the user; (3) verifying that the image of the iris is a live image; (4) capturing, at the electronic device, a side image of the iris; (5) verifying, using the at least one computer processor, a transparency of a cornea in the side image of the iris; and (6) authenticating the user.

In one embodiment, the image of the iris may be a video of the iris.

In one embodiment, wherein the step of capturing an image of an iris of a user may include: capturing a first image of a first iris of the user; and capturing a second image of a second iris of the user. The first image and the second image may be the same image. In another embodiment, the first image and the second image may be a video.

In one embodiment, the step of verifying that the image of the at least one iris of the user is a live image may include: capturing a first image of at least one pupil of the user at a first lighting level; capturing a second image of the at least one pupil of the user at a second lighting level; determining, using the at least one computer processor, a change in a size of the at least one pupil in the first image and the second image; determining a change in lighting level in the first lighting level and the second lighting level; and determining if the change in the size of the at least one pupil is proportional to the change in lighting level.

In one embodiment, the change in lighting level may be caused or changed by illuminating a light on the mobile device.

In another embodiment, the change in lighting level may be caused by changing a brightness of the touch screen on the mobile device.

In one embodiment, the step of verifying that the image of the at least one iris of the user is a live image may include: instructing the user to perform an eye movement; capturing, at the electronic device, at least one second image of the at least one iris; and verifying that a position of the iris in the first image and the second image are different. The instruction to perform an eye movement may be an instruction for the user to look in a direction. In another embodiment, the instruction may be for the user to blink.

The method may further include detecting, using the at least one computer processor, if the user is wearing color contact lenses.

In one embodiment, the step of verifying, using the at least one computer processor, a transparency of a cornea in the side image of the iris may include comparing, using the at least one computer processor, biometrics data from the image of the cornea to stored cornea biometrics data for the user.

A method for automatically generating a biometric profile for a user is disclosed. According to one embodiment, the method may include (1) at least one computer processor accessing stored biometric data for a user; (2) at least one computer processor grouping the stored biometric data into a plurality of clusters; (3) the at least one computer processor checking the stored biometric data for consistency; (4) the at least one computer processor acquiring new biometric data for the user; and (5) at least one computer processor generating a new biometric profile for the user.

In one embodiment, each of the clusters may have a statistically significant correlation level.

In one embodiment, each of the clusters may comprise biometric data having a common feature.

In one embodiment, each of the clusters may be associated with at least one biometric algorithm.

In one embodiment, each of the clusters may be associated with an upper threshold and a lower threshold.

In one embodiment, the stored biometric data may be checked for consistency within each cluster.

In one embodiment, the stored biometric data may be consistent if it is within a predetermined threshold.

In one embodiment, the stored biometric data may be checked for consistency within each profile.

In one embodiment, the stored biometric data may be checked for consistency across a plurality of profiles.

In one embodiment, the stored biometric data may be checked for consistency within a modality associated with the profile.

In one embodiment, the stored biometric data may be checked for consistency within a channel associated with the profile.

In one embodiment, the stored biometric data may be checked for consistency within a use case.

In one embodiment, the stored biometric data may be checked for global consistency.

A method for generating multiple biometric profiles for a user is disclosed. According to one embodiment, the method may include (1) receiving data from a user, the data comprising biometric data for a user and device specifications for the electronic device; (2) at least one computer processor retrieving at least one existing user profile; (3) the at least one computer processor determining whether the data is consistent with at least one of the existing profiles; and (4) the at least one computer processor updating at least one existing profile if the data is consistent with the existing profile.

In one embodiment, the existing profile may be based on a voice biometric, an image biometric, a device specification, and/or a use case.

In one embodiment, the step of determining whether the data is consistent with at least one of the existing profiles may include comparing the data and the existing profile to a predetermined threshold.

In one embodiment, the predetermined threshold may be based on a transaction risk, a user status, etc.

In one embodiment, the method may further include: the at least one computer processor determining whether the data is inconsistent with the at least one existing profile; and the at least one computer processor securing an account associated with the user in response to the data being inconsistent with the at least one existing profile.

In one embodiment, the step of determining whether the data is inconsistent with at least one of the existing profiles may include comparing the data and the existing profile to a predetermined threshold.

In one embodiment, the predetermined threshold may be based on a transaction risk, a user status, etc.

In one embodiment, the method may further include the at least one computer processor determining whether the data is inconsistent with the at least one existing profile; and the at least one computer processor creating a new profile in response to the data not being inconsistent with the at least one existing profile.

A method for authenticating a user is disclosed. According to one embodiment, the method may include (1) receiving, from an electronic device, authentication data, the authentication data comprising at least one of a user biometric data, electronic device data, and environmental data; (2) at least one computer processor comparing the authentication data to a plurality of existing user profiles; (3) the at least one computer processor selecting an algorithm and at least one threshold for each of the plurality of existing profiles; (4) the at least one computer processor calculating a confidence score using the selected algorithm for each comparison with each of the plurality of existing profiles; and (5) the at least one computer processor comparing each confidence score to the selected threshold for each of the plurality of existing profiles; and calculating a combined metric for the plurality of confidence scores.

In one embodiment, the method may further include the at least one computer processor applying a spoofing risk factor to each confidence score.

In one embodiment, the method may further include the at least one computer processor performing at least one consistency check for each comparison with each of the plurality of existing profiles.

According to one embodiment, a method for generating multiple biometric profiles for a user is disclosed. The profiles may be consistent among each other and within themselves by specified threshold levels.

According to one embodiment, a method for customization of biometrics algorithms, thresholds and markers for the specific profile is disclosed.

According to one embodiment, a method for biometrics authentication of a user that exhibit a variation of biometrics characteristics (such as face, voice biometrics, etc.) and acquisition channel characteristics (device microphone, camera characteristics, etc.) and environmental conditions (lighting, noise levels, etc.) through selective use of customized biometrics markers is disclosed.

According to one embodiment, a method for securely maintaining multiple biometrics markers where a new biometrics profile can only replace one biometrics cluster and not the entire collection of n profiles is disclosed.

According to one embodiment, a method for acquiring additional biometrics markers based on spoofing characteristics of individual biometrics modalities through, for example, look-up table based identification of complementary markers is disclosed.

According to one embodiment, a method for consistency checks within individual biometric profiles and/or across multiple biometric profiles for a given user is disclosed.

According to one embodiment, a method for automatic generation and gradual adjustments of biometrics profiles of users over time to capture time varying biometrics markers is disclosed.

According to one embodiment, a method for integrated confidence scoring of biometrics data based on, for example, (i) inherent biometrics variations of the user, (ii) acquisition channel/device variations, (iii) environmental condition variations, (iv) biometrics modality and algorithm specifications, and (v) spoofing characteristics through metric-based scoring of the confidence levels is disclosed.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
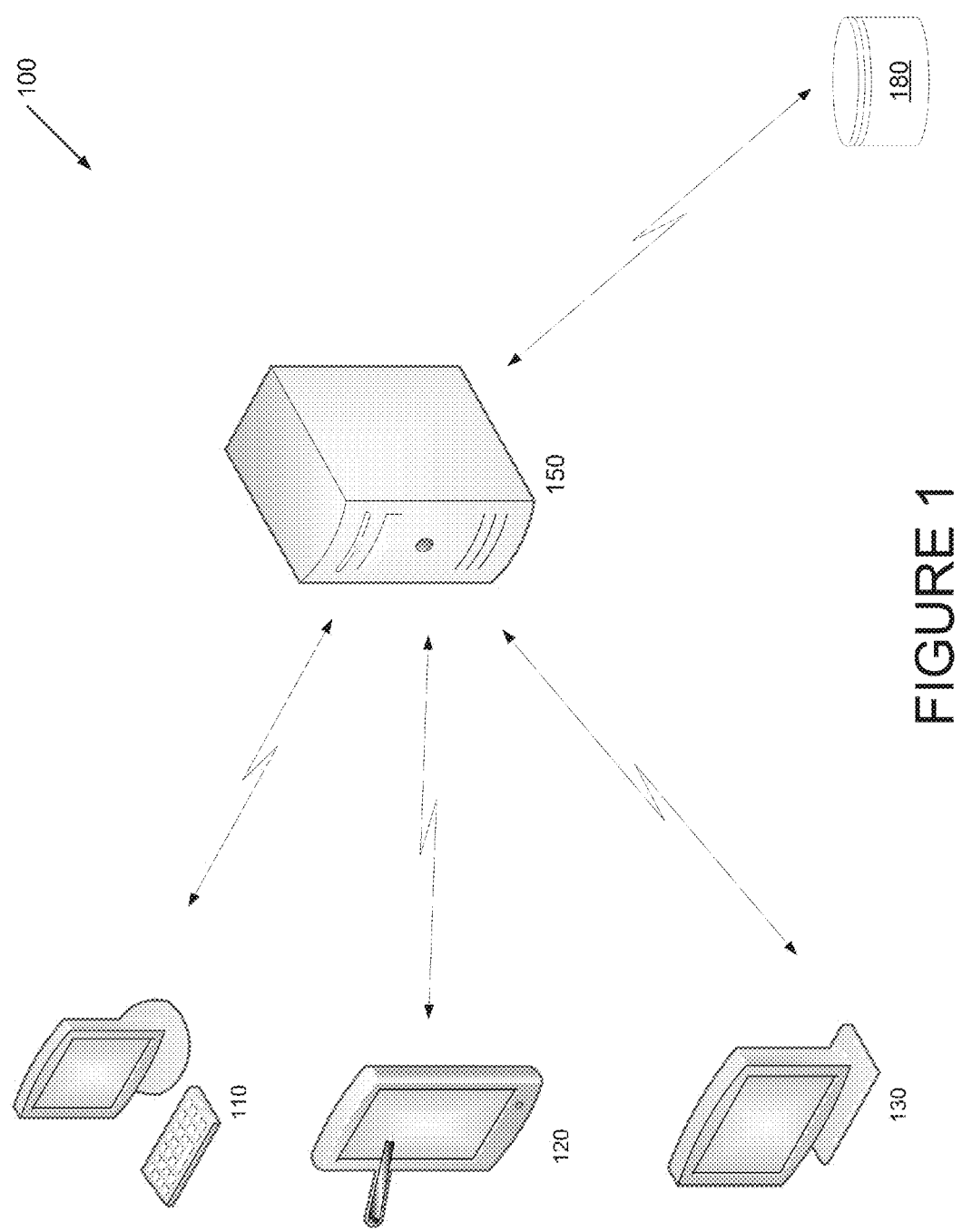
FIG. 1 is a block diagram of a system for high fidelity multi-modal out-of-band biometric authentication according to one embodiment.

Several embodiments of the present invention and their advantages may be understood by referring to FIGS. 1-17, wherein like reference numerals refer to like elements.

Embodiments of the invention relate to a biometrics authentication process. This authentication may be used, for example, if a user seeks to access a network, to sign-in to an account, to authorize a certain transaction (e.g., a high risk/value transaction), to authorize access to a computer application, such as a mobile application, a computer program, etc. In one embodiment, a mobile device may be used to authenticate a user's access to an account on a desktop computer. For example, a code, such as a QR code, may be displayed on the screen of the desktop computer on which the user is seeking to access an account, conduct a transaction, etc. Using the user's registered mobile device, the user may "simultaneously" (i.e., within a predetermined short time period, such as 5 seconds) scan the QR code with the front-facing camera, take an image of the user's face, facial features (e.g., eyes, irises, etc.) with the rear-facing camera, and speak a verbal password for the microphone. The server may authenticate the user based on all three entries (e.g., code, facial image, voice biometric, etc.).

Other biometrics, such as iris recognition (using the rear-facing camera), finger print, retinal scan, DNA sample, palm print, hand geometry, odor/scent, gait, etc. may be used. In one embodiment, infrared cameras may be used to capture a user's thermal signature.

To authenticate a user using a mobile device in the absence of a desktop, a QR code may not be used. Facial recognition and a biometric, however, may still be entered "simultaneously." Other inputs, including gestures, touch patterns, etc. may be used as necessary and/or desired.

During the voice registration process, the server may record phrases, words, etc. These phrases may be used as recorded, or the words contained therein may be interchangeable. The system may account for variations in pronunciation based on the location of each word in the phrase.

Behavioral characteristics, such as the angle at which the user holds the mobile device, the distance from the user's face when taking an image, etc. may also be captured and used for authentication.

The server may also provide time stamping/geostamping to the phrase, such as having the user speak the current date/time, the user's location, an answer to a prompt provided by the mobile device, etc. The GPS location and server date/time may also be appended to the authorization request. This may not only be useful in the authorization process, but may also be useful in reducing fraudulent false claims.

Several biometrics may be combined into a single composite or integrated biometric. For example, a user may register several full biometrics (e.g., voice, finger print, signature, etc.) that may be combined into an integrated biometric, or the user may register an integrated biometric that is generated at the mobile device.

In another embodiment, an integrated biometric may not include a full biometric, but rather portions of several biometrics. When the user provides the biometric samples, only an integrate biometric may be transmitted for authentication. This may be used if limited bandwidth is available, or if the transmission of a full biometric is prohibited.

In certain environments, such as noisy environments, it may be difficult to accurately capture a voice sample for authentication. Alternatively, a user may not wish to provide a voice entry in public, or additional verification for a specific transaction, etc. Thus, other authentication methods, such as tracing a pattern over, for example, the image (live or static) of a user's face, highlighted portions of the user's face, using gestures such as blinking, touching lips, eyes, ears, etc. may be used. The user may also be presented with a signature space, the location and orientation of which may vary to prevent machine-generated signatures. The speed, pressure, etc. applied during the signature process may be captured as well to assist in authentication.

A user's profile may also identify delegates who may be able to authenticate the user if the user is unable to authenticate him or herself (e.g., the user has laryngitis or other ailment) or a biometrics match falls below a predetermined threshold. The delegate may also be required to be a registered user, and may have to authenticate him or herself before authenticating the user.

Referring to FIG. 1, a block diagram of a system for high fidelity multi-modal out-of-band biometric authentication according to one embodiment is provided. System 100 includes workstation 110, which may be any suitable computer, including for example, desktop computers, laptop computers, notebook computers, etc.

System 100 may further include mobile electronic device 120. In one embodiment, mobile electronic device 120 may be a smartphone (e.g., Apple iPhone, Samsung Galaxy, etc.), a tablet computer (e.g., Apple iPad, Samsung Galaxy, Amazon Kindle, Barnes & Noble Nook Tablet, etc.), Google Glass, Smart E-watch/Bracelet, etc. In one embodiment, mobile electronic device 120 may include at least one camera for capturing a machine readable code (e.g., a bar code, QR code, etc.), a microphone, and a speaker. In one embodiment, mobile device 120 may include a front-facing camera and a rear-facing camera.

In one embodiment, system 100 may include screen 130 that may be part of an access control system for a secure area. Screen 130 may be part of an access control system that may be provided at the exterior of a secure area.

System 100 may include server 150. In one embodiment, server 150 may host an application that may be used to authenticate a user. Although only one server is depicted in FIG. 1, more than one server may be provided. For example, a server for biometric authentication may be provided, a server for facial recognition may be provided, etc.

Database 180 may receive, store and/or maintain user information, account information, biometric information, etc.

Workstation 110, mobile electronic device 120 and screen 130 may communicate with server 150 over any suitable network, including the Internet, a local area network, wide area network, virtual private network, etc. In one embodiment, workstation 110 and mobile electronic device 120 and/or screen 130 may communicate with each other using any suitable communication protocol, including WiFi, Bluetooth, Near Field Communication, etc.

Figure 2:
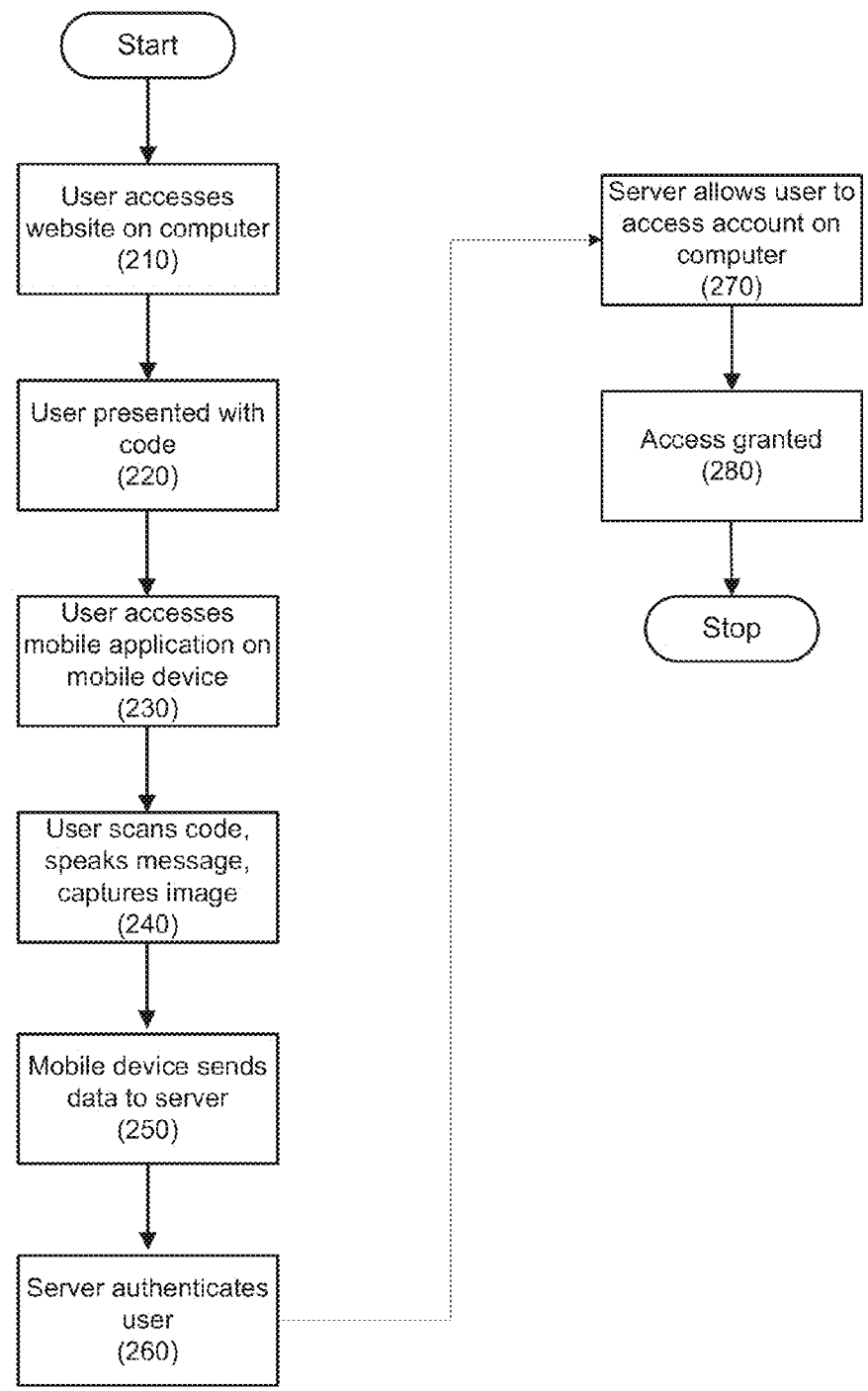
FIG. 2 is a flowchart depicting a method for high fidelity multi-modal out-of-band biometric authentication according to one embodiment.

Referring to FIG. 2, a method for high fidelity multi-modal out-of-band biometric authentication according to one embodiment is provided.

In step 210, the user may access a website. In one embodiment, the website may require the user to provide credentials before the user is granted access to the site.

In one embodiment, the user may access the website on a workstation, on a mobile device, on an access panel outside a secure area, etc. For convenience, embodiments will be described in the context of a "workstation," It should be appreciated, however, that this term encompasses desktop computers, notebook computers, laptop computers, access panels, etc.

The website may be any website that maintains an account for the user. For example, the website may be a company website that may require the user to log in. In another embodiment, the website may be for a financial institution with which the user has an account. In another embodiment, the website may be for a medical facility. The website may be used for any suitable business or organization as necessary and/or required.

In another embodiment, the website may be part of an organization's intranet or local area network.

In still another embodiment, the user may launch an authentication computer program or application, such as a mobile application on a mobile device.

For simplicity, the terms "computer program" and "mobile application" will be used interchangeably.

In step 220, the workstation may present the user with a code on the website. In one embodiment, the code may include a unique identifier that may link a browser session, access session, etc. to the user.

In one embodiment, the code may be a machine-readable code, such as a QR code, a bar code, an image, characters, etc. Any suitable code may be used as necessary and/or desired.

In one embodiment, the code may be provided on other devices that have access to the network, including other mobile devices, computers, tablets, televisions, monitors, etc. In one embodiment, the device that provides the code may be a "trusted" device (e.g., a registered device).

In one embodiment, the code may be provided as a RFID code, an audible code, an infrared code, etc.

In one embodiment, the code may be provided instead of a "traditional" log-in screen (e.g., enter a user name and password). In another embodiment, the code may be provided in addition to the traditional log-in information.

In another embodiment, the user may be presented with the code under certain circumstances. For example, the user may periodically be required to authenticate using the code. This may be done weekly, monthly, bi-weekly, whenever the user changes passwords, etc.

In another embodiment, the user may be required to provide authentication when he or she attempts to conduct a transaction with a risk level or value level above a predetermined threshold. For example, if the user attempts to transfer $5,000 from his or her account, the user may be required to provide additional authentication. As another example, if the user attempts to access an area of the website that requires additional security, the user may be required to provide additional authentication.

In one embodiment, the workstation may also provide data to the server. For example, the workstation may provide the session ID, user ID, and a biometrics to the server.

In step 230, if the user has not already accessed a computer program or mobile application, the user may access a mobile application on a mobile device. In one embodiment, the mobile application may provide an interface to receive the code and, for example, receive at least one image of the user and receive a biometric from the user.

In one embodiment, the user may be required to register the mobile device with the server before the mobile application may be used. In another embodiment, the mobile application may be accessed when the code is received. In still another embodiment, the mobile application may be a mobile website accessed on the mobile device.

In another embodiment, the server may push an invitation by, for example, email, text, etc. to a registered mobile device. The invitation may include a link for the user to access an on-line authentication website, a link to download a mobile application, etc.

In step 240, the user may provide the required data to the mobile device. In one embodiment, the user may first input the code, and then will have a predetermined amount of time to provide at least one additional data entry. For example, the user may have 5 seconds to take at least one image of the user's face, and to speak a letter, word, phrase, number, etc. for the mobile device to record.

In one embodiment, three data inputs may be required. The first data input may be the code, the second input may be an image of at least a portion of the user, and the third input may be a biometric of the user.

In one embodiment, the three inputs may be received using three different input devices on the mobile device. For example, the user may use the front-facing camera to scan the code, the rear-facing camera to take at least one image of the user while the microphone receives the voice data from the user. In another embodiment, a touch screen on the mobile device may be used to receive a touch-based biometric (e.g., a fingerprint) from the user. In still another embodiment, gyroscopes and other devices on the mobile device may be used to detect an angle of the mobile device when taking an image of the user, etc.

In one embodiment, after receiving the code, the mobile device may decode the code to access the unique identifier or other information that may be encoded in the code.

In one embodiment, if a voice biometric is captured, the mobile device may display the letter(s), number(s), word(s), phrase(s), etc. that the user is to speak. In one embodiment, an image may be provided, and the user may be prompted to speak the name of the object (e.g., a dog is displayed and the user says "dog.").

In one embodiment, the user may be requested to provide a variable response as part of the voice response, where "variable" means a response that differs from what has been trained or recorded. For example, the user may register certain words or phrases with the server. During authentication, however, the user may be asked to repeat words or phrases that differ from those that were registered. The server may analyze the entered voice and determine if the spoken voice matches the registered voice and expected/predicted behavior.

In one embodiment, the user may be prompted to speak a "secret" phrase or password/passcode. In one embodiment, the user may be requested to use the secret phrase in a sentence. For example, if the user's passcode is "fat cat," the user may say "I just saw a fat cat walk down the street." In another embodiment, the user may be prompted to give verbal commands (e.g., "I'd like to log in to my account") to the systems as a part of the voice authentication. This information may then be used to cross check if the actions are consistent with verbal commands. In addition such natural language provides improved user experience.

In one embodiment, multiple, interchangeable words, numbers, phrases, etc. may be provided. In another embodiment, multiple passphrases may be extracted using training data set and may be rotated. For example, five different passphrases may be rotated, and two custom passphrases may be created based on trained data. The word "voice" is in the trained set used in combination with others for other custom phrases. In one embodiment, a combination and/or fusion of the previously described modalities may be used to match the speed/user experience characteristics, security levels, environmental conditions through machine learning techniques.

In another embodiment, for words that are not trained, the system may apply predictive-based techniques. Thus, if the user says "My voice is my password" instead of "My voice is my passphrase," the system can determine whether the word "password" meets the user's speech characteristics.

In still another embodiment, additional information to be provided or may be selected by the server. For example, the server may request a time stamp (e.g., date/time), a geo-stamp (e.g., the mobile device's location), a corporate/function stamp, an answer to server prompted question, etc. For example, the user may be requested to state the date, user's location, name of the user's employer, temperature, weather, stock quote, etc. The required additional information may be selected randomly, thereby decreasing the likelihood of an imposter being able to successfully use a recording.

In one embodiment, if the user does not complete the entry within a predetermined time, the entry process may stop. In one embodiment, the user may be given a limited number of attempts (e.g., 2 attempts) to enter data before a new code is required, an alternate logon is provided, etc. In another embodiment, after a predetermined number of unsuccessful logon attempts, the account may be locked or access may be otherwise restricted.

In step 250, the mobile device may provide the data to the server for verification. In one embodiment, each input (e.g., code, image(s), voice sample, etc.) may be provided to the server separately. In another embodiment, two or more of the inputs may be combined as to form an integrated sample.

Additional data may also be captured and provided to the server. For example, behavioral biometrics, such as the position (e.g., angle, distance from the face, etc.) that the user holds the mobile device may be determined. In another embodiment, characteristics of the user's speech (e.g., number of words/minute, intonation, etc.) may be determined. The GPS location of the mobile device may be provided. The time that the user took to enter all data may also be provided. In one embodiment, this data may be compared against previously-collected data to identify anomalies, outliers, etc., that may indicate fraud. In one embodiment, this data may be stored and future accesses may be compared against this data.

In step 260, the server may review the received data and authenticate the user, or decline access to the user. In one embodiment, any biometrics authentication may be performed by a biometrics server.

In one embodiment, the server may check with organization policies to make sure that use of biometric authentication is approved for granting access, authorizing a transaction, that the user is authorized based on the user's role to authorize the transaction, etc.

In one embodiment, the code may be verified. In one embodiment, this may include verifying the data in the code, checking the time that it took from the code being provided to the user to the completion of the data entry, etc. In one embodiment, session data from the code may be validated and/or verified.

In one embodiment, the voice data may be reviewed to see if it is consistent with stored voice data. Examples of suitable commercially-available voice authentication software include VoiceVault Fusion by VoiceVault, VoiceVerified by CSID, VocalPassword™ and FreeSpeech™ from Nuance.

In one embodiment, variations in the voice sample may be considered based on the location of a word, number, letter, etc. in a phase that is spoken. For example, a user may speak a word differently depending on where the word is located in a phrase (e.g., beginning versus end), the word(s) that is spoken before/after, etc. Thus, if the word is not in the same spot as in the registration sample, some variation may be expected.

In step 270, if the user is authenticated, the server may allow the user to access the account, webpage, secure area, authorize the transaction, etc. In one embodiment, the server may allow the user to bypass the traditional user name and password log-in. In another embodiment, the user may still provide the traditional login information.

In one embodiment, the data received may be stored in a database if it was successful, if it was unsuccessful, or both. Successful data may be used to refine the voice biometric data, face recognition data, etc. for future access. It may also be used to identify repeated attempts to access an account, and may be provided to the authorities as necessary.

In step 280, access may be granted to the workstation, mobile device, etc. In one embodiment, an application on the workstation, mobile device, etc. may periodically poll the server for authorization.

Modifications may be made in situations where the entry of a voice biometric may not be appropriate, may be undesirable, or may not be possible. For example, a user may be in a noisy environment, in a meeting, etc. or may not feel comfortable speaking his or her passphrase out loud. Thus, image/video-based authentication, such as facial recognition, may be used.

In another embodiment, modifications may be made when additional authentication is required for certain transactions.

For example, in one embodiment, the user may make at least one gesture during the image capture. For example, the user may touch or move his or her eyes, ears, nose, lips, or any other location that has been preselected by the user. In another embodiment, the user may be instructed to touch a certain point of his or her face by the mobile device. In another embodiment, the user may blink, wink a predetermined number of times, in a predetermined pattern, etc., make facial gestures (e.g., smile, frown, etc.). This real-time instruction may be used to reduce the possibility of an imposter capturing an image of a picture of the user.

In another embodiment, the user may touch or indicate at least one element or area on the captured image. For example, after image capture, the image may be displayed to the user with regions on the face being highlighted or otherwise indicated. The regions may be color coded by the face recognition algorithm. The user may select at least one region, trace a trail among several regions, etc.

In another embodiment, markers (e.g., dots or a similar indicator) may be provided on the image of the user, and the user may be requested to trace a registered pattern among the markers. In one embodiment, the user may be requested to trace a pattern over a live image/video of himself or herself in real-time.

In another embodiment, the user may sign his or her name on the screen while the front-facing camera captures an image or video of the user signing. In another embodiment, the user may sign a space that may be randomly located on an image of the user's face.

In still another embodiment, behavioral profiles may be considered. For example, a detailed profile of user behavior including markers such as the distance from the mobile device to the user's face, the direction/angle of the mobile device, background images, light/noise levels, etc. may be considered. In one embodiment, if the anomaly exists (e.g., the mobile device is much further from the face than any other prior validation, etc.) the authentication attempt may be denied.

In another embodiment, a physical gesture password may be used. For example, after an image is captured, the user may be presented with the image of the face with markers superimposed thereon. In one embodiment, the markers may be based on characteristics of the user' face (e.g., structure, location of features, etc.). In one embodiment the user may selectively zoom in/out of regions using, for example, touch-screen features to create alternative images/distortions of the image that may be sent to the server for authentication.

In one embodiment, the markers may be specifically created by the face recognition algorithm. As such, the markers are biometrically significant/specific to the user. The position of the markers may change based on the captured image of the user on the device screen, which is affected by the distance between the device/face, angle/tilt of the face, direction of the camera, etc.

In another embodiment, the markers may be positioned in an array. Any suitable relationship between the markers and the face, including no relationship, may be used as necessary and/or desired.

In another embodiment, the user may touch at least one area of the user's face (e.g., ears, nose, chin, or biometric marker highlighted area, etc.), may blink a certain number of times, may make lip movements, expressions, etc., without blinking, etc.

Figure 3:
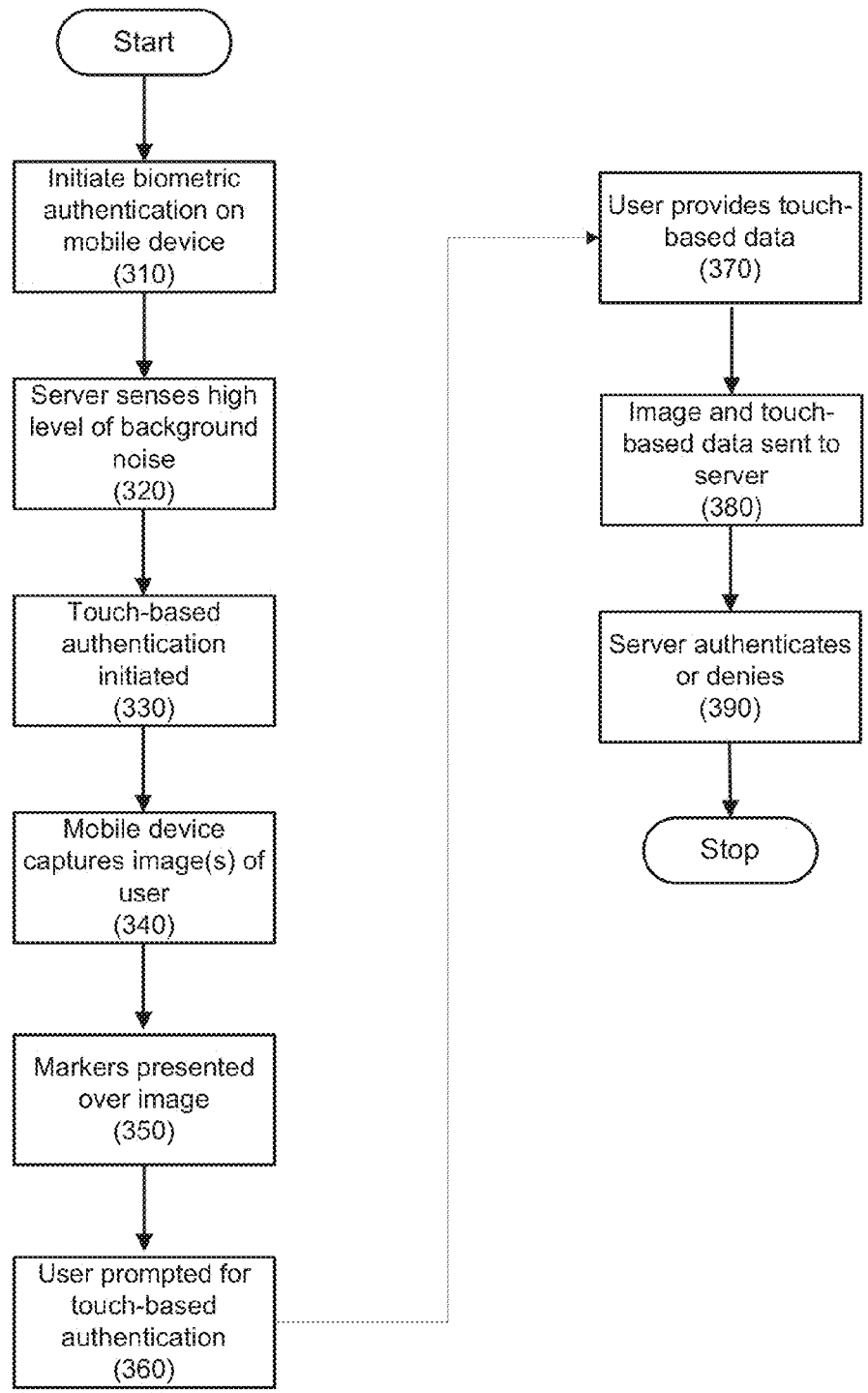
FIG. 3 is a flowchart depicting a method of authentication using touch and face recognition according to one embodiment.
Figure 4:
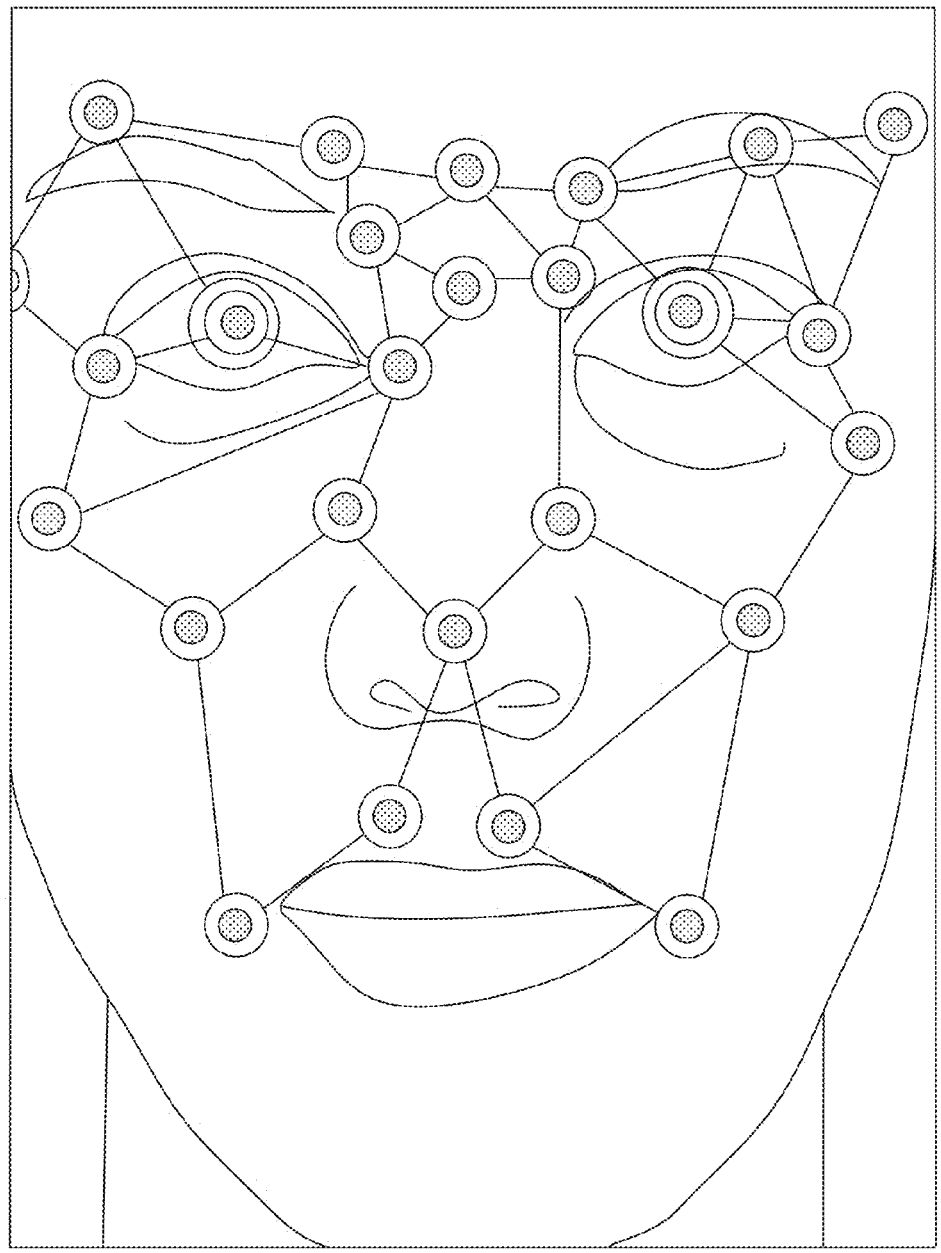
FIG. 4 depicts an example of a facial image with markers according to one embodiment.

Referring to FIG. 3, a method of authentication using touch and face recognition is provided. In step 310, the user may initiate biometric authentication on the user's mobile device.

In step 320, the server may sense a high level of background noise, thereby making voice-based authentication more difficult, undesirable, etc. In another embodiment, the user may determine that he or she does not wish to use voice-based authentication. In still another embodiment, the server may require additional authentication from the user.

In step 330, touch-based authentication may be initiated. In one embodiment, touch-based authentication may involve the user touching a captured image of himself or herself in at least one place, in a pattern, etc. In another embodiment, touch-based authentication may involve the user signing an area on the captured image. In still another embodiment, touch-based authentication may involve the user making a gesture by touching or otherwise indicating at least one area of the user's face during image capture.

In step 340, the mobile device may capture at least one image of the user. In one embodiment, the mobile device may capture a video of the user.

In one embodiment, a detailed profile may be acquired. For example, the device may capture background noise level/profile, lighting profile, GPS location of the mobile device, background image, etc. for anomaly detection.

In one embodiment, if gestures are used, the user may touch/indicate at least one area of the user's face during image capture.

In step 350, the mobile device may present an image of the user on the screen of the mobile device. In one embodiment, markers may be superimposed over the image of the face. In one embodiment, the location of the markers may be based on the features of the user's face. For example, markers may be provided at the corners of the user's eyes, center of the eyes, eye brows, corners of the mouth, nose, cheeks, etc. An example of such markers are provided in FIG. 4.

In another embodiment, the markers may be positioned independent of the facial features, and may present an array (e.g., a 4 by 4 array) or any random structure as necessary and/or desired.

In another embodiment, the user may be presented with an area to enter the user's signature on the image. In one embodiment, the size, location, and/or orientation of the signature area may vary so as to reduce the likelihood of imposters, robo-signatures, etc. In one embodiment, the speed of the signature, the pressure, and other signing characteristics may be captured and considered.

In one embodiment, the signature is required to fit a custom area marked by biometrics markers (i.e., aspect ratio, angle/tilt, size and other aspects of the signature have to be adjusted). This makes the process significantly difficult for imposters with previously captured signature profiles or cases where the imposter mimics signature manually.

In another embodiment, a signature space is not provided for the user on the image. Instead, the user pre-selects the markers that indicate the signature space, and enters his or her signature within that space. Thus, if the user does not know the markers, he or she will be unlikely to enter the signature in the proper area.

In step 360, the user may be prompted to provide the touch-based authentication. In one embodiment, if the user has multiple touch locations and/or patterns, the user may be reminded of the touch/pattern to enter.

In step 370, the user may provide the touch-based entry. For example, the user may touch at least one area of the face, at least one marker, etc. In another embodiment, the user may trace a pattern among the markers, areas, etc. Any suitable entry may be provided as necessary and/or desired.

Figure 5A:
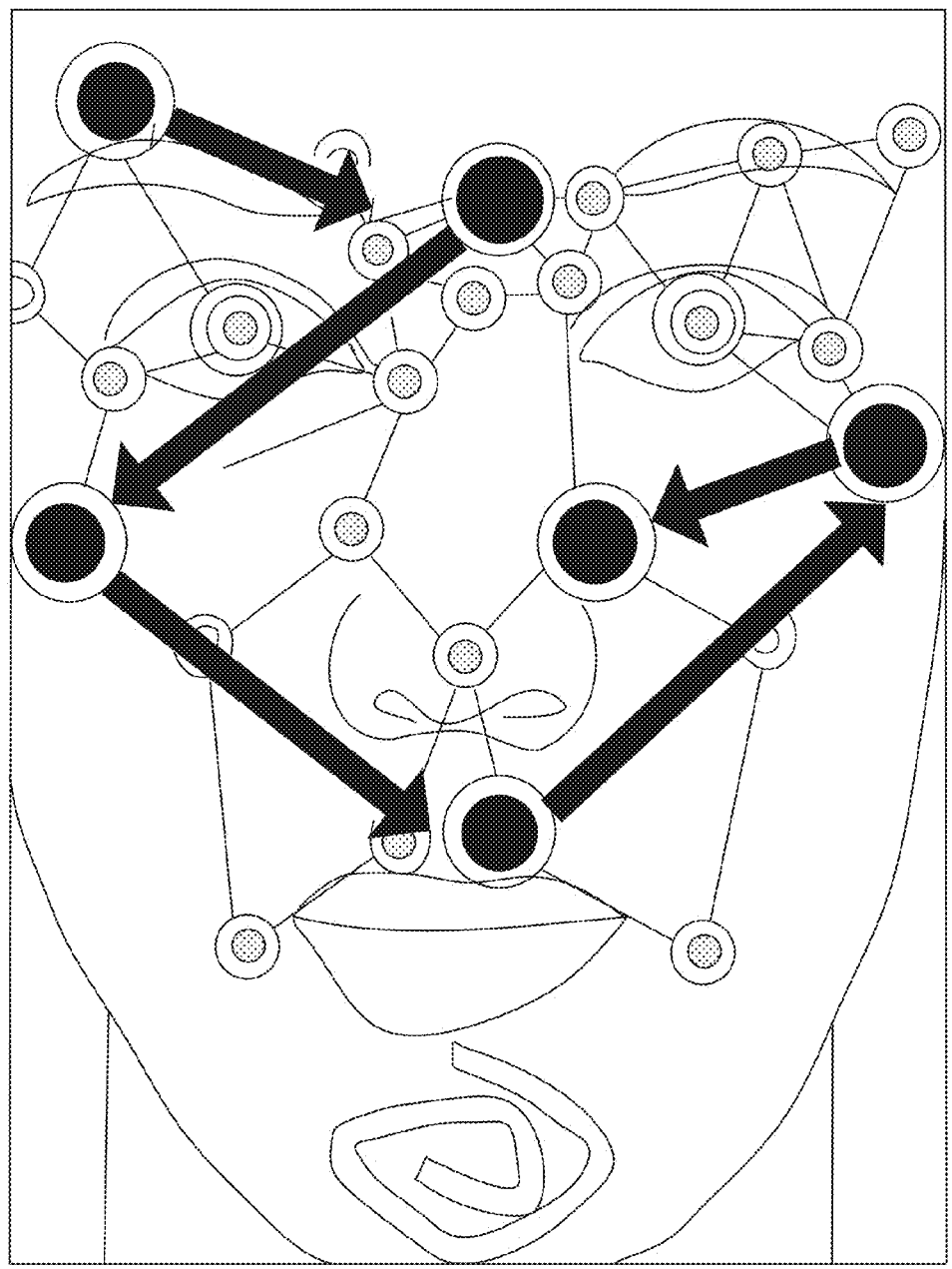
FIGS. 5A and 5B depict examples of tracing on facial images according to embodiments.
Figure 5B:
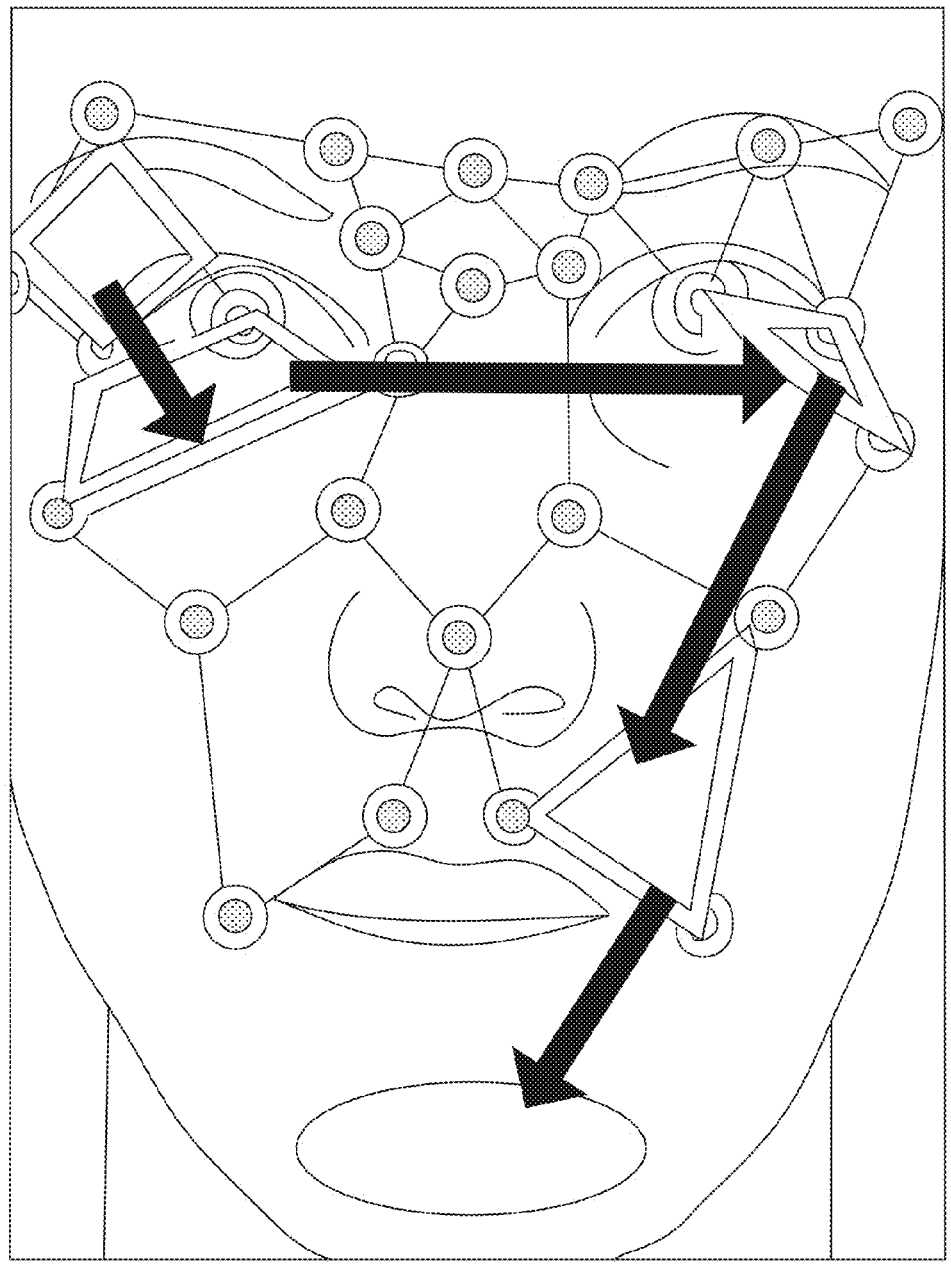

An example of tracing from marker to marker is provided in FIG. 5A, while an example of tracing from different areas is provided in FIG. 5B.

Figure 6:
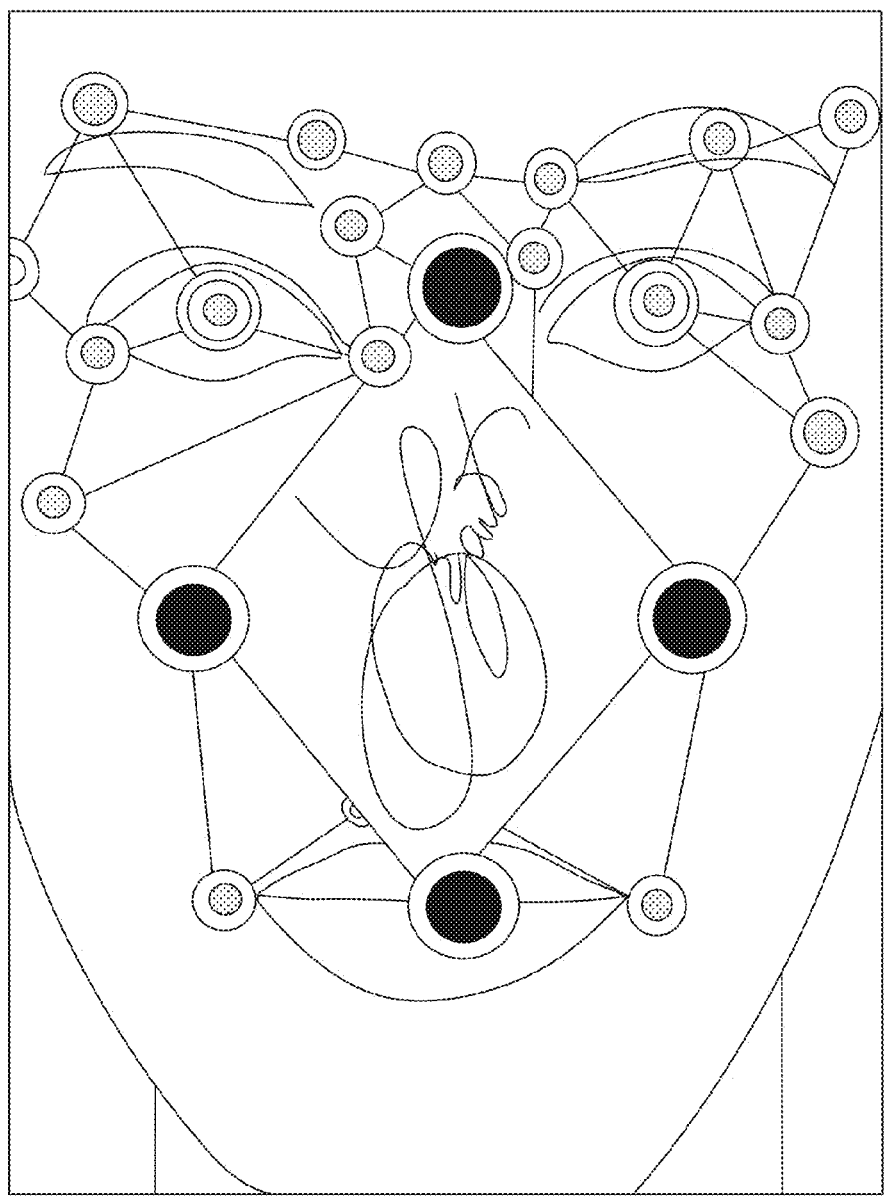
FIG. 6 depicts an example of the entry of a signature on a facial image according to one embodiment.

An example of a user entering a signature is provided in FIG. 6.

In step 380, the image and the touch-based data may be provided to the server, and, in step 390, the server may authenticate or deny the user.

Figure 7:
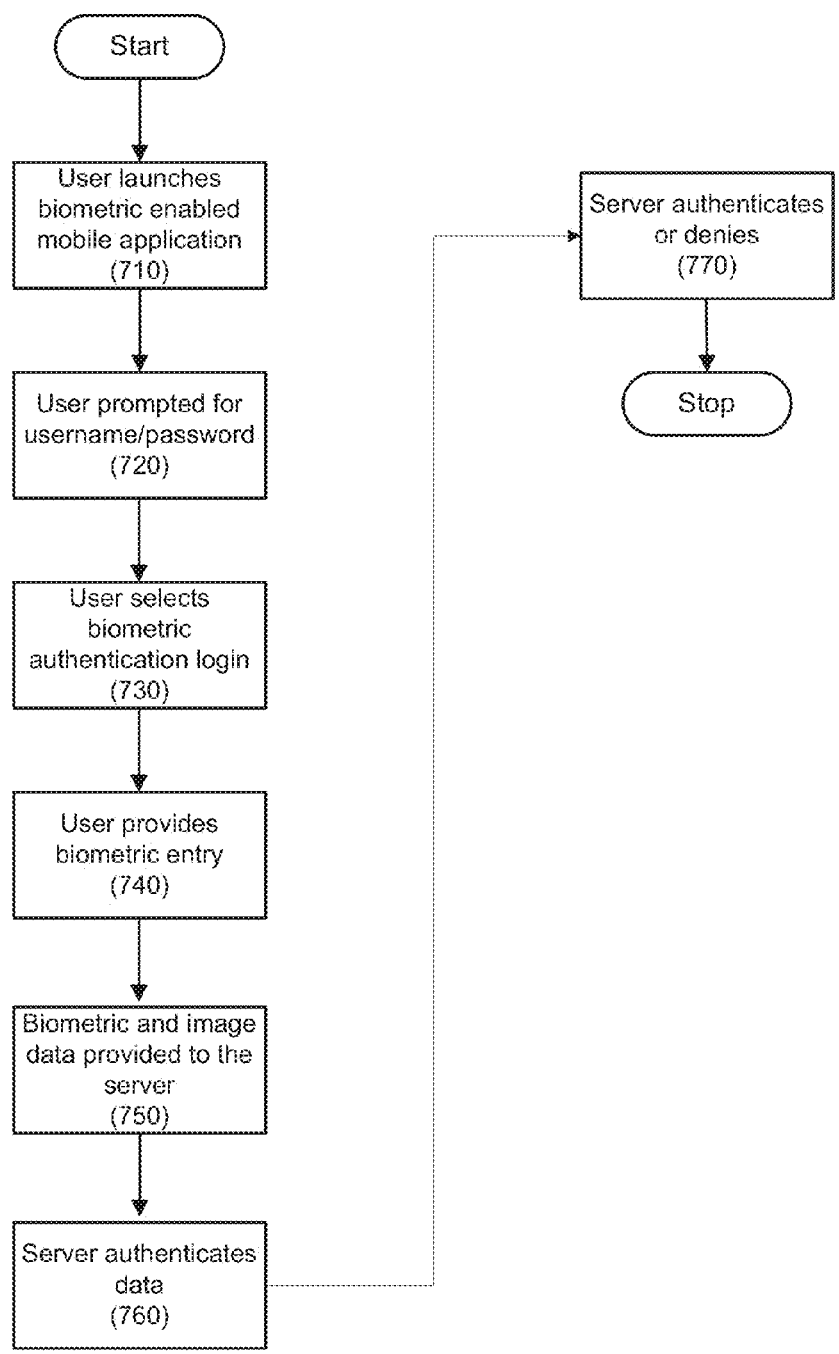
FIG. 7 is a flowchart depicting a method of authenticating a mobile application using biometrics according to one embodiment.

Referring to FIG. 7, a method of authenticating a mobile application using biometrics is provided.

In step 710, the user may launch a biometric-enabled mobile application on a mobile device.

In step 720, the mobile application may prompt the user for traditional login information (e.g., username and password) or for biometric authentication.

In step 730, if the user selects biometric authentication, the mobile device may prompt the user for biometric entry.

In step 740, the user provides at least one biometric entry. In one embodiment, at least one image, video, etc. of at least a portion of the user (e.g., the user's face) may be captured. In another embodiment, a voice biometric may be captured. In still another embodiment, a touch-based biometric may be captured.

Combinations of images and biometrics may be captured as is necessary and/or desired.

In step 750, the mobile device may submit the captured data to the server. For example, in one embodiment, the biometric and image data may be submitted to the server.

In step 760, the server may authenticate the data.

In step 770, if the server authenticates the data, the user is logged in to the mobile application. Otherwise, access is denied.

In another embodiment, biometric authentication may be used on individual transactions. For example, for transactions that are above a pre-specified threshold, biometric authentication may be required. The threshold may be based on a value of the transaction, a risk of a transaction, an anomaly detection algorithm, a likelihood of fraud, etc. In one embodiment, the authentication may be requested by providing a mobile device with a machine readable code (e.g., QR code), near field communication, Bluetooth, etc.

In one embodiment, the use of biometric authentication may reduce the number of false fraud claims, as the biometric authentication is tied to the user (e.g., image, speech, signature, combinations thereof, etc.) may be tied or linked to the user providing authentication.

Figure 8:
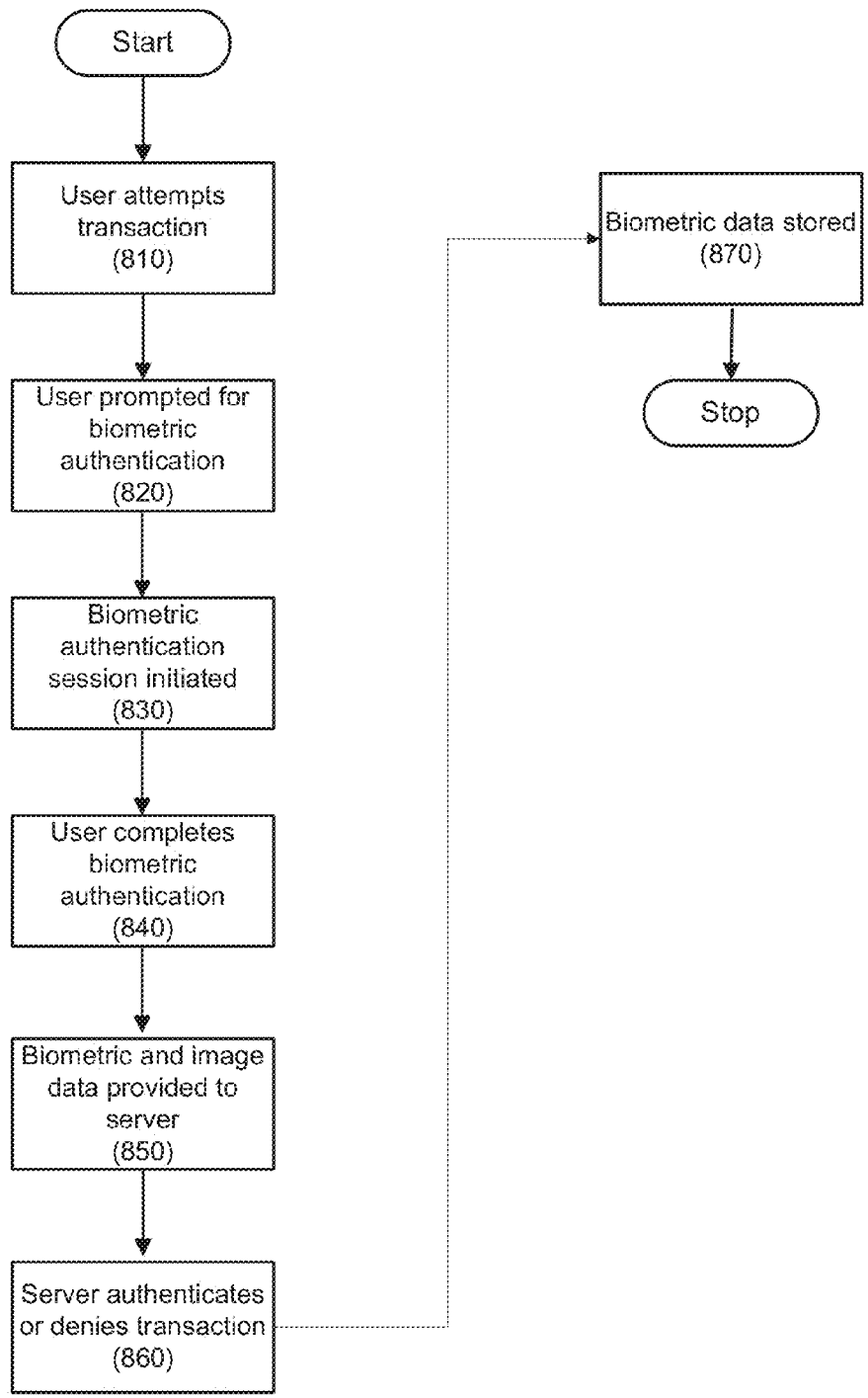
FIG. 8 is a flowchart depicting a method of authenticating a transaction using biometrics according to one embodiment.

Referring to FIG. 8, a method of authenticating a transaction is provided.

In step 810, a user may attempt a transaction that may exceed a predetermined threshold. The threshold may be based on a value of the transaction, a risk of a transaction, an anomaly detection algorithm, a likelihood of fraud, etc.

In step 820, the user is prompted for biometric authentication.

In step 830, a biometric authentication session is initiated on the mobile device.

In step 840, the user completes the biometric authentication. The level of biometric authentication may vary depending on the value of the transaction, amount of risk, etc.

In one embodiment, the biometric authentication session may be tied to the proposed transaction. For example, the user may be required to state "please execute transaction 556439." The user may further be required to provide a voice biometric or other biometric.

In step 850, the biometric and image data may be provided to the server.

In step 860, the server may authenticate or deny authentication, and therefore, the transaction.

In step 870, the biometric data is stored and associated with the transaction. For example, the captured image and signature, pattern, voice, etc. may be stored with the transaction file.

In one embodiment, the system may be retrained to address false rejections (e.g., rejections followed by successful password authentication). For example, after a certain number of false rejections (e.g., 2), the password authentication acquired biometrics may be incorporated with higher weight to retrain the biometrics system.

In one embodiment, the user can manually initiate a retraining session to address changes in behavior/appearance (e.g., glasses that will distort the eye biometrics, wearing contacts, surgery that alters the face biometrics markers, voice/health problems, etc.).

As discussed above, composite biometrics may be used. A composite biometric may be a combination of more than one biometric. In one embodiment, the composite biometric may include biometrics for more than one individual. For example, instead of storing and authenticating based on personal biometrics, composite images/profiles for groups of people (e.g. employees in the same group) with the same level of access may be created. Thus, in one embodiment, only composite biometrics are stored, sent, and received, rather than individual profiles.

In one embodiment, composites may be based on approval chains for transactions, shared geographic location, department, role, etc.

For similarly located persons, the proximity or relative locations of mobile devices in the group may be used.

Once the biometrics data is captured through a mobile device, the authentication process may match the user's captured data to the composites. In one embodiment, only differences from the composites are sent to the server. Thus, the mobile device may not need to store personalized biometrics, making it less susceptible to being compromised.

Figure 9:
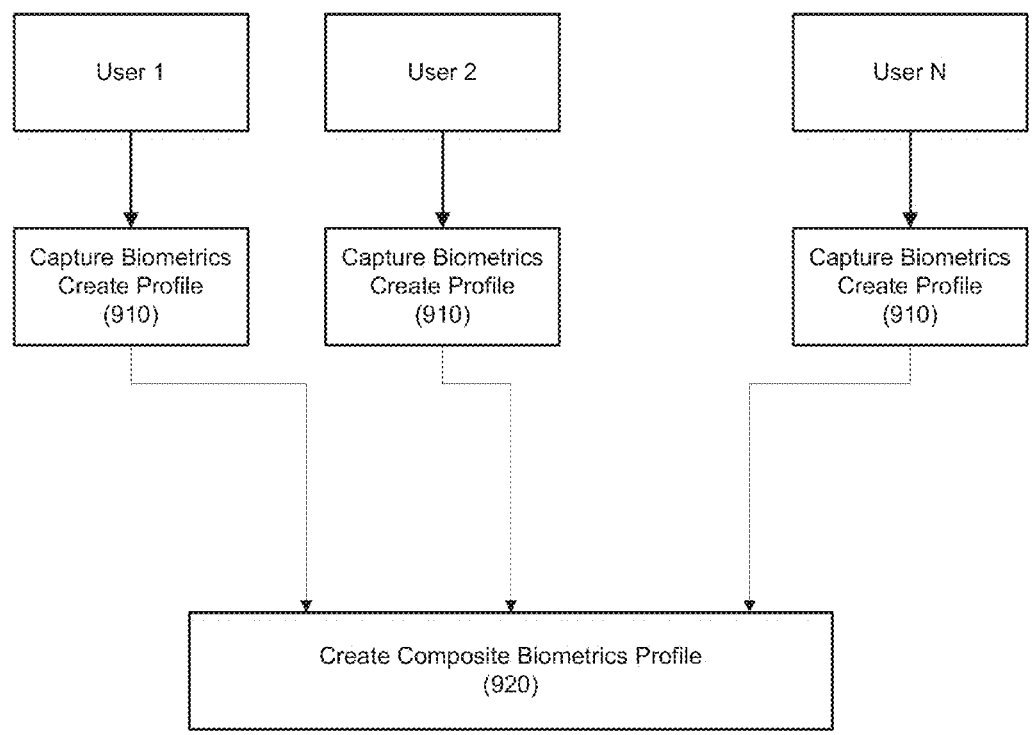
FIG. 9 depicts a composite biometric capture process according to one embodiment.

Referring to FIG. 9, a composite biometric capture process is provided. First, in step 910, the biometrics for User 1-User N are captured, and an individual profile is created. Next, in step 920, a composite biometrics profile for any group of User 1-User N is created.

Figure 10:
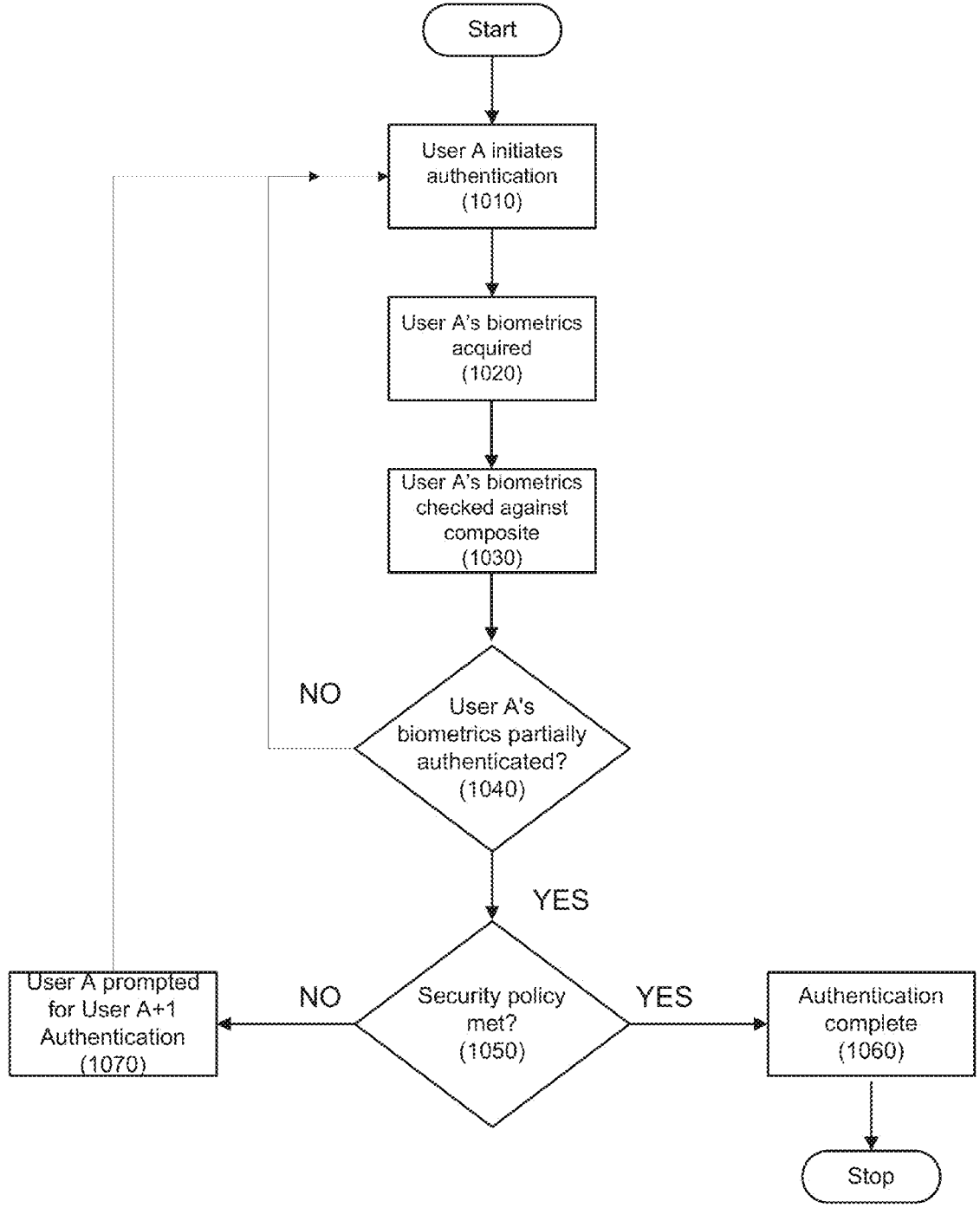
FIG. 10 depicts an authentication process for multi-user composite biometrics according to one embodiment.

Referring to FIG. 10, an authentication process for multi-user composite biometrics according to one embodiment is provided. In step 1010, User A initiates biometric authentication. In one embodiment, User A may be attempting to authenticate a transaction.

In step 1020, User A's biometrics may be acquired. In one embodiment, User A's biometric may be acquired using a mobile device as discussed herein.

In step 1030, User A's biometrics may be compared against a composite profile for a group. In one embodiment, individual biometrics may be checked against the composite biometrics vector through calculating delta function and match rates. User biometrics may be weighed based on, for example, the user's specific job role, transaction details, risk factors, environmental conditions and the quality of biometrics/confidence for the individual user.

In step 1040, if the User A's biometrics are not partially authenticated, the process may continue to recapture User A's biometrics.

If User A's biometrics are partially captured, the security policy may be checked. For example, a check may be made to ensure that User A has authority to authorize the transaction. In another embodiment, a check may be made to see if multiple users need to authorize the transaction. If, in step 1050, the security policy is met, then in step 1060, authorization is complete.

If the security policy is not met, in step 1070, User A is prompted for User A+1 to provide biometric authentication. This may involve getting someone higher on the chain to authorize the transaction, another person of the same level, etc.

In one embodiment, "interactive biometrics" may be used. In one embodiment, an integrated biometrics process may not focus on capturing or matching based on individual modalities of biometrics such as purely face recognition or voice recognition. Instead, it creates an integrated profile where key markers may be tied to each other to create integrated markers in a multi-dimensional spatio-temporal vector space.

Figure 11:
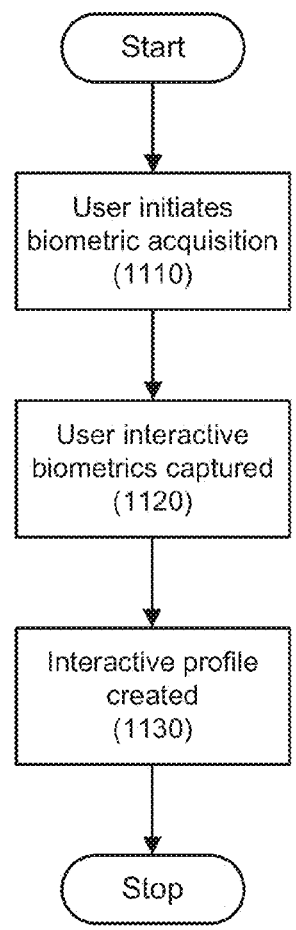
FIG. 11 depicts an interactive biometric capture process according to one embodiment.

Referring to FIG. 11, an interactive biometric capture process is disclosed. In step 1110, the user may initiate biometric acquisition.

In step 1120, the user's interactive biometrics may be captured. In one embodiment, the interactive process may be a fused capture where a free form interactive activity is translated to multiple fused biometrics profiles on the server end. A fused process may integrate and/or link multiple modalities and individual features for a user.

In one embodiment, biometrics markers may be spatio-temporally linked with respect to other markers and environmental parameters. Examples include (1) the user's facial biometrics markers while saying a selection of specific keywords; (2) the user's facial biometrics markers for facial expressions/gestures in response to the interactive process; (3) behavioral profile during face recognition (e.g., blinks), behavioral gestures during interactive process; (4) the distance between user's face to mobile device to read a set of words from the screen; (5) the user's impulse response characteristics linked to, for example, pupil sizing, face biometrics, etc. when presented familiar images or images that create behavioral response such as facial gestures; and (6) an image profile that may be linked to an infrared profile during interactive speech.

In one embodiment, the integrated biometrics process may identify key marker links among image/voice/behavioral, etc. data to create new features for authentication. For example, markers <1-N> in image, <x-y> in voice, <p-q> in behavioral profile may create a specific spatio-temporal pattern/feature during the interactive process that uniquely identifies the user across multiple biometrics planes.

In one embodiment, the process may execute with the user's attention. In another embodiment, the process may run in the background while the user performs other tasks.

The interactive process may capture biometrics, including for example, face biometrics, iris biometrics, voice biometrics, behavioral biometrics (through video recording), keyboard/touch screen usage, other forms of biometrics/behavioral profiles, etc.

In step 1130, a profile for the user is created. The resulting integrated profile may have partial biometrics for individual modalities, such a N features out of total M features for face recognition. Individual features in face recognition, however, may be linked to other modalities, such as voice/video based behavioral profiling, to environmental factors, etc.

Figure 12:
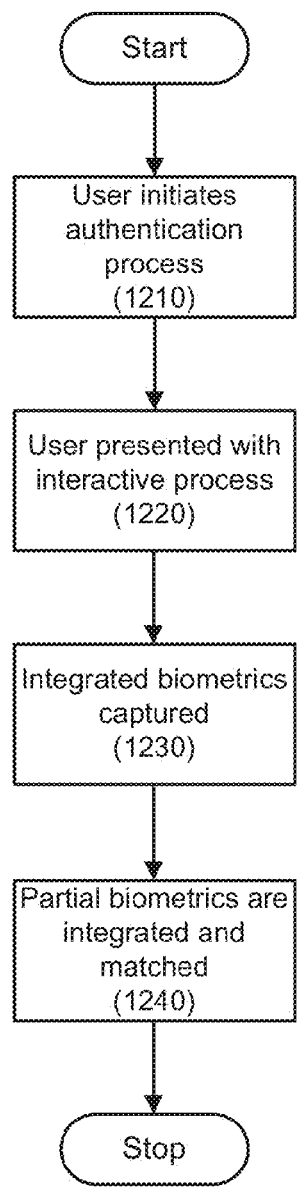
FIG. 12 depicts an authentication process involving integrated biometrics according to one embodiment.

In FIG. 12, an authentication process involving integrated biometrics according to one embodiment is provided.

In step 1210, the user may initiate an integrated biometrics authentication process. This may be done, for example, by using a mobile application executed on a mobile device.

In step 1220, the user is presented with an interactive process.

In step 1230, multiple biometrics and/or data are captured in an integrated process. In one embodiment, this process may capture a plurality of face biometrics, iris biometrics, voice biometrics, behavioral biometrics, keyboard/touch screen usage, and other biometrics/data as necessary and/or desired.

In one embodiment, as part of the acquisition, biometric features and data may be linked and analyzed with respect to each other and/or environmental factors, etc.

In step 1240, partial biometric features may be integrated and matched using, for example, corresponding matching scores. In one embodiment, the user may not be verified or authenticated in any individual modality, but rather though an integrated linked modality. This may provide higher levels of security against spoofing, imposters, etc.

In one embodiment, additional security features may be used. For example, multiple biometrics may be captured and/or recognized simultaneously. In one embodiment, a user's iris and face (and other modalities) may be recognized simultaneously. This may be accomplished using a mobile device's camera, for example. In another embodiment, Google Glass, or a similar device, may be used for iris recognition using a high-resolution image of one eye.

In another embodiment, simultaneous face recognition and finger printing may be used. For example, thin film technology may be used to allow finger print authentication using the mobile device touch screen. This enables simultaneous face recognition and finger printing, where the fingerprint and face biometrics are captured by user simply holding the mobile device.

In one embodiment, customizable fused partial modes may be based on a user's geographical location and available biometrics data. For example, partial face recognition (using eye area) with voice recognition may be used. This may be useful in areas where the use of full biometrics is not permitted.

In one embodiment, the use of full, partial, composite, etc. biometrics may be based on user preferences. In one embodiment, the user preferences may be set by the user, based on the user's calendar, based on the GPS location of the mobile device, etc.

In one embodiment, machine learning based techniques may be used to determine the modalities, thresholds, algorithms, etc. that are best fitted to be used in that specific session based on a multi-dimensional vector including user preferences, security settings, environmental factors, transaction characteristics, etc.

Figure 13:
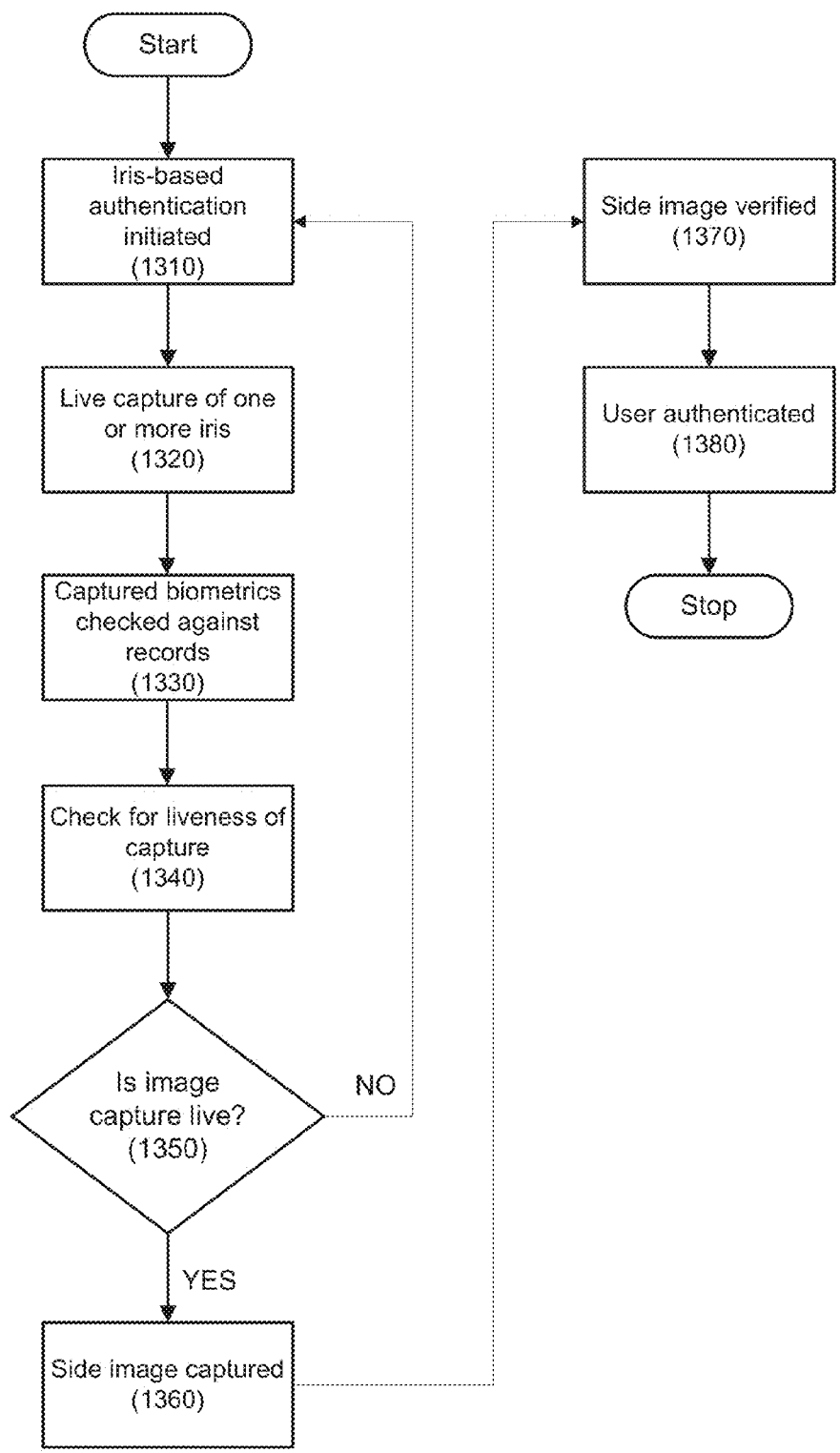
FIG. 13 depicts an exemplary iris capture method according to one embodiment.

Referring to FIG. 13, a flowchart depicting an iris recognition technique according to one embodiment is disclosed. In one embodiment, iris recognition may be a part of any of the authentication processes disclosed herein. In another embodiment, iris authentication may be a stand-alone process.

In step 1310, an iris-based authentication process is initiated. In one embodiment, iris authentication may be a stand-alone authentication procedure. In another embodiment, iris authentication may be part of a larger authentication process.

In step 1320, an image, video, etc. of one or both of the user's irises may be captured. In one embodiment, the iris capture may be performed by the user's mobile electronic device. In another embodiment, the iris capture may be performed by a camera provided for a desktop or notebook computer. In still another embodiment, the iris capture may be performed using any suitable camera, such as a security camera.

In one embodiment, the image or video may be captured sequentially (i.e., one after the other). In another embodiment, the image or video capture may be performed in parallel (i.e., both irises at the same time).

In step 1330, the captured image may be compared to iris information in a database. In one embodiment, this comparison may be performed by the mobile device sending some, or all, of the image data to a server. In another embodiment, this comparison may be made at the mobile device.

In one embodiment, anomaly detection may be performed on the captured image/video. In one embodiment, this may involve checking the size of the irises with eye-region biometrics from the user's profile, prior authentications, etc. Other anomaly detections may be performed as necessary and/or desired.

In step 1340, the mobile device and/or server may determine if the captured image, video, etc. is a live image, video, etc. In one embodiment, this may be performed by instructing the user, via the user's mobile device or suitable interface, to look up, look down, cross eyes, etc. In one embodiment, the user may have a limited time (e.g., 2 seconds) to respond as directed.

In another embodiment, different lighting may be used to check for a live image. For example, multiple images and/or video may be used to detect the change in pupil size in response to different lighting. In general, the size of the change in pupil size is proportional to the level of lighting change. Thus, in one embodiment, the lighting level and the pupil size may be determined for different lighting levels.

In one embodiment, the user's mobile device may use its flash, change the brightness of its screen, etc. to cause a change in lighting level.

In one embodiment, a check may be made to see if the image of the compressed or decompressed iris is consistent with the user profile, a stored image, etc. For example, the compressed or decompressed iris image may be a systematically distorted version of the original image, where different features are distorted with different scaling factors based on their location. The distortion may be calculated based on an elastic band model, can be matched against a profile, etc. For matching, the user can be profiled with different lighting conditions such that the system acquires a number of dilation factors (e.g. 25%, 50%, 75%, 100%).

In one embodiment, the images/video may be checked to determine if the user is wearing colored contact lenses. In one embodiment, a check may be made for a detectable pattern in the inner circle of the iris. In another embodiment, a check may be made for pattern changes with different lighting. In another embodiment, a check may be made for outer periphery effects of color contacts, whether there are detectable ring shadows around the iris, etc. In still another embodiment, a blinking test may be performed to determine if the iris is moving relative to the rest of the patterns during/after blinking. Other checks, combinations of checks, etc. may be used as necessary and/or desired.

In one embodiment, an IR image/video may be used check the image/video of the irises. In one embodiment, the IR image/video may be checked against historical data.

In step 1350, if the capture is live, in step 1360, a side image, video, etc. of the iris may be captured.

If the image is not a live image, the process may start over. In another embodiment, the account may be locked. This may occur after, for example, one failed attempt, a certain number of failed attempts.

In step 1370, the side image may be verified. In one embodiment, the system may check for the clarity, transparency, etc. of the side view of cornea. In one embodiment, biometrics data for the cornea may be verified. In still another embodiment, if color contact lenses are detected, a check is made to determine if the color contacts block the light in the side view.

In step 1380, if the side image is verified, the user may be authenticated. In another embodiment, the user may proceed to additional authentication (biometrics and otherwise) as necessary and/or desired.

The disclosures of the following are hereby incorporated, by reference, in their entireties: U.S. patent application Ser. Nos. 13/492,126; 13/297,475; 11/337,563; 12/534,167; 10/867,103; 12/715,520; 10/710,315; 10/710,328; 11/294,785; and U.S. Pat. Nos. 8,028,896 and 7,117,365.

In one embodiment, a user may have a plurality of profiles. For example, different profiles may account for the use of different devices that may have different camera types, different camera resolutions, etc. (e.g., Apple iPhone versus Samsung Galaxy). The different profiles may account for changes in an individual's physical appearance, such as sometimes wearing glasses/sunglasses, wearing makeup, growing facial hair, etc. The different profiles may also account for different environments (different lighting, different background noise levels, etc.). The different profiles may account for occasional changes in an individual's voice due to allergies, different seasons, different times of day, etc. Any suitable profiles, and combinations thereof, may be used as necessary and/or desired.

In one embodiment, multiple profiles may be created by the individual to capture any of the above, and any other necessary and/or desired, variations. The multiple profiles may be created at one time (e.g., a user creates a profile without wearing eyeglasses, and then creates a profile while wearing eyeglasses), or may be created over a period of time (e.g., captured during multiple visits). In one embodiment, the profiles may be captured as part of a historical capture of biometrics data from the user. In other words, the user may not need to specifically create a biometrics profile, but instead the profile may be created automatically as variations are detected during successful access attempts. For example, a new profile may be automatically created and maintained by the system as it gradually emerges from successful authentication attempts. By clustering the data automatically, the system may identify and/or create a new profile.

In another embodiment, the user may be required to create a new profile after an unsuccessful biometrics attempt due to a change in biometrics if certain matching thresholds are met. This may be after one unsuccessful attempt, multiple unsuccessful attempts, etc. In one embodiment, this may require additional security screening, such as checks of other biometrics, security administrator approval, password-based authentication, etc.

In one embodiment, the user may have n different profiles. In one embodiment, the n profiles may contain a single data point, or it may include a "cluster" of biometric data based on authentication attempts having a statistically significant correlation level. For example, a cluster may contain data for authentication attempts that involved the user wearing glasses. The data in that cluster may be different from data in a cluster where the user is not wearing glasses. Thus, within each cluster, the data may be consistent up to a certain threshold, and may differ substantially only in certain respects.

For example, profile 1 may be a cluster of a user profiles with the user wearing glasses. Profile 2 may be a cluster of historical user profile data and a device having certain specifications. Profile 3 may be a cluster user of profiles where the user has a cold and a different voice profile. Profile n may be a cluster of user profiles using a specific device that may deviate from other profiles. Other profiles may be used as is necessary and/or desired.

In one embodiment, as profiles are created, environmental factors, such as lighting, noise, device variations, etc. may be captured and stored.

In one embodiment, each of the n profiles may be associated with a customized selection of algorithms, thresholds, biometrics markers, etc. There may be a collection of biometrics algorithms for each modality, each multi-modal/integrated modality, etc. In one embodiment, each algorithm may include weakness factors related to, for example, environmental conditions, profile specifics, effectiveness (e.g., iris recognition algorithm is not as successful in lower lighting levels as with natural day light), etc.

In one embodiment, the algorithms may be updated on an ongoing basis. For example, based on experience with the user and/or with other users, weakness factors, weighting, thresholds, etc. may be modified and/or adjusted as is necessary and/or desired. In one embodiment, a wide variety of biometric algorithms may provide different accuracy and performance trade-offs. For example, some face recognition algorithms may perform better in natural light, while others may perform better in artificial lighting. Similarly, some voice recognition algorithms may exhibit superior performance in environments with certain noise characteristics, but not in others.

The user of multiple profiles enhances security. For example, by not restricting the user profile to one instance, the spoofing risk is reduced as the spoofer, or imitator, cannot immediately replace all n profiles by a one time hack of an account. Even if one instance of the profile is hacked, and a fake profile generated, the remaining n−1 profiles will remain intact and prevent authorization.

In one embodiment, all n profiles may be checked by the system for consistency every time a new profile is generated, on a regular basis, etc. The existence of a new, hacked profile may result in a security review.

For example, in one embodiment, a consistency check may be performed each time a biometrics authentication session is initiated. In another embodiment, consistency checks may be performed periodically. In another embodiment, consistency checks may be performed randomly. In still another embodiment, the frequency of consistency checks may be based on the profile data, a risk profile of the user (number of devices user, variation of profiles, job function, risk profile of transactions), the type of transaction, etc. Any or all of the above may be used as is necessary and/or desired.

When a user's biometrics are captured for authentication purposes, the acquired biometrics may be compared to some, or all, of the n profiles. For each biometrics capture, markers, an algorithm, and an algorithm threshold may be selected. In one embodiment, inter-biometrics links for integrated biometrics may be selected. For example, the system may link the biometrics markers spatio-temporally (i.e., distance and time) in different modalities. These links or inter-biometric markers may indicate unique patterns that specifically describe the relationships between markers (both in terms of distances and in terms of precise timing of these markers).

For each of the n profiles, a score is generated, and an algorithm and data confidence score factor is generated. In one embodiment, the data confidence score factor may be a metric score that specifically focuses on the matching confidence calculated by the customized algorithms, customized set of thresholds, and markers selected for the profile. Spoofing risk-factors, which account for the possibility of a different risk/type of spoofing for each given modality, algorithm, and environmental factors may be applied. For example, it may be more likely for an image than a voice biometric to be spoofed.

As a result, a confidence score for each of the n profiles may be generated.

The confidence score for each of the n profiles may then be compared to a lower threshold and an upper threshold. If the confidence score is between the upper and lower thresholds, then the biometrics may be recaptured. In one embodiment, this may be the side or profile view of the user's facial biometrics, which can be acquired through the mobile device.

If the confidence score is above the upper threshold, or below the lower threshold, then a combined confidence metric based on the vector of each user profiles and associated confidence scores are calculated. For example, a confidence score that is above the upper threshold indicates that the biometrics algorithms indicate a strong match. On the other hand, a confidence score that is lower than the lower threshold indicates that the biometrics algorithms indicate a very weak match, one that is far from the users stored biometrics profile data.

As time progresses, the user's profile may be updated. For example, with each access, the subtle changes that take place with aging may be accounted for.

In one embodiment, the system may be able to adjust a profile for a user that was acquired using a first device to account for differences in a second device. For example, if a biometric profile is acquired using an iPhone, the system may be able to "predict" the profile that may be captured with a second device (e.g., a Samsung Galaxy).

Figure 14:
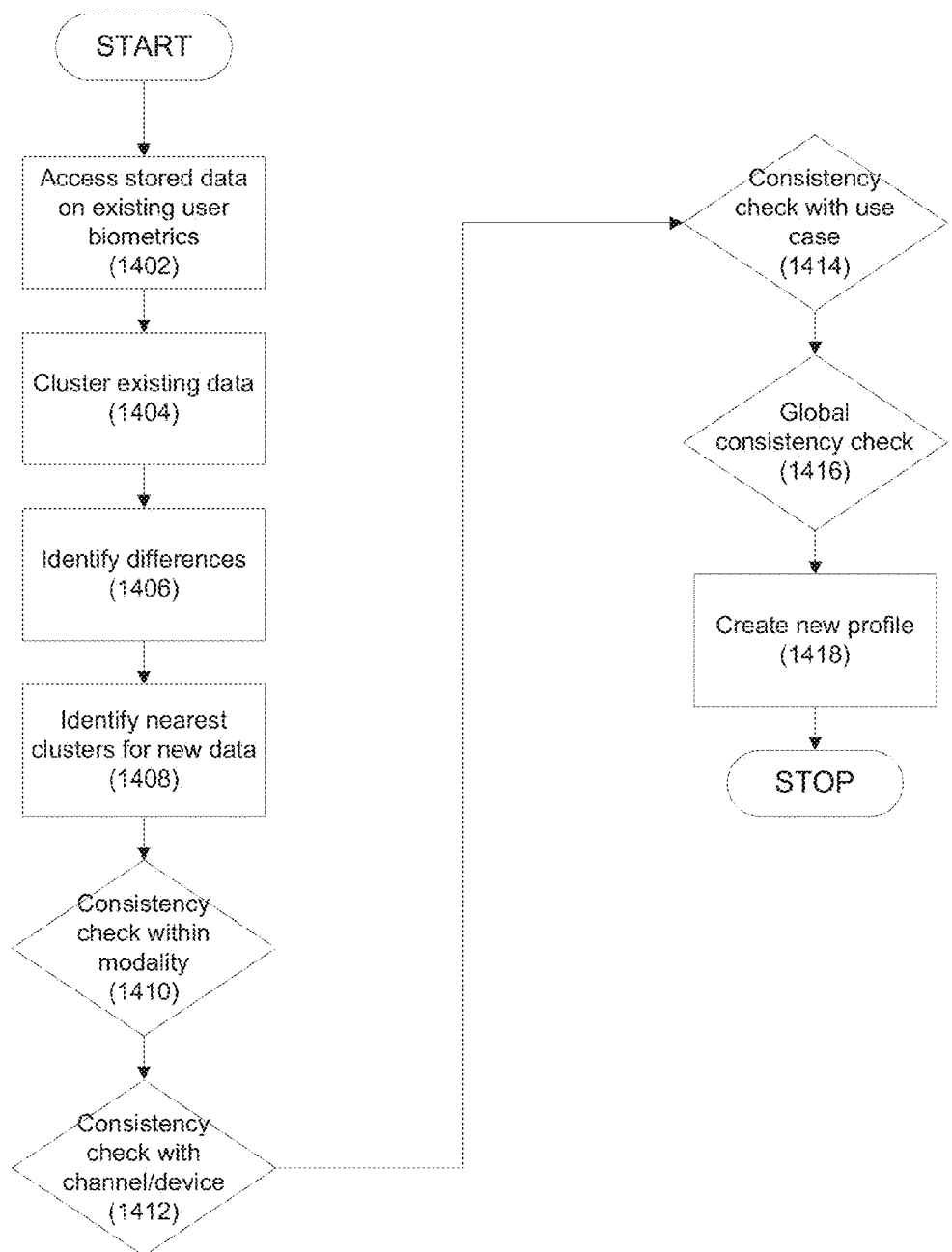
FIG. 14 is a flowchart depicting a method for automatically generating a user profile according to one embodiment.

Referring to FIG. 14, a flowchart depicting a method for automatically generating a user profile according to one embodiment is provided.

In step 1402, stored biometric data for the user may be accessed. In one embodiment, all existing biometric data for the user may be accessed. In another embodiment, only some of the existing biometric data may be accessed. For example, only biometric data that is within a certain age (e.g., 1 year, 1 month, 1 week, etc.) may be accessed. In another embodiment, only biometric data of a certain type (e.g., voice, facial, finger print, etc.) may be accessed. Any suitable amount of existing data, type of existing data, etc. may be used as necessary and/or desired.

In one embodiment, data regarding the capture device, such as device type (e.g., iPhone 5, Samsung Galaxy, etc.), camera resolution, microphone characteristics, hardware/software specifics, etc. may be retrieved as necessary and/or desired.

In step 1404, existing biometric data may be "clustered." In one embodiment, the data may be grouped into groupings having a statistically significant correlation level. For example, a "nearest neighbor-based cluster" may be created where the distances are calculated based on Euclidean distance between the data points (or other distance metrics depending on the modality).

In one embodiment, existing data in nearest neighbor clusters for individual modalities may be clustered. The allowable variance between data in the clusters, and across different clusters, may be specified by, for example, a security policy. For example, a security policy may constrain the user to use a specific set of devices and models and other types of devices may not be accepted. For example, if the security policy only allows for iPhones, data from a Samsung or other device will not be accepted as this does not comply with the security policy.

In another embodiment, a security policy may not permit users to create profiles or modify profiles with face biometrics changes (e.g., ones with beards, mustaches, etc.). Rather, those policies must be created by the organization, may require additional authorization/approval, etc.

In one embodiment, the security policy also may specify how much variation is allowed among different profiles. For example, in a high security environment, such as an investment bank, the variation may be limited to <10%. In a lower security environment, such as social networking, the authentication the variation may be up to 20%. Biometric profile variation may be calculated as a combined metric of delta variation between markers in individual or integrated biometrics modalities.

In step 1406, differences between newly acquired biometric data and stored data may be identified. By comparing the newly acquired data with stored data a simple differential profile is created. This provides information on what biometrics markers are varying in this profile. For example, if the new profile is created for a user with glasses, the biometrics markers around the eye will likely appear in the differential, while other markers will be substantially the same.

In one embodiment, consistency checks within the clusters, and between clusters, may be performed. Consistency checks within a cluster involve checking biometrics markers within a single profile. For example, if a profile is dedicated to the user with glasses, the data for all instances of users biometrics with glasses should be substantially consistent. Consistency checks are performed for each new acquisition of biometrics data. In addition regular consistency checks are performed to ensure consistency within individual profiles and across multiple profiles.

Consistency checking among clusters checks the match across multiple profiles. For example, if the biometrics markers around the nose are inconsistent between a profile with glasses and a profile without glasses, this may be flagged as an inconsistency. If the difference exceeds a predetermined threshold, this may be marked or flagged for further review, notification, etc.

In step 1408, the nearest clusters for new biometric data are identified. For example, newly acquired biometrics data may be compared against existing clusters by comparing the distance between the data and individual clusters based in multi-dimensional vector space based on Euclidean distance or other distance metrics based on the biometrics modality.

In step 1410, the acquired biometric data may be checked for consistency within the modality. In one embodiment, a check may be made to see if any unchanged markers are consistent. In another embodiment, a check may be made to see if the changed markers are consistent with each other.

In step 1412, the acquired biometric data may be checked for consistency within the channel and/or device. In one embodiment, a check may be made to determine if the new biometric data is consistent with an expected resolution for the capturing device (e.g., to verify the camera), sample rate for the capturing device (e.g., to verify the microphone and/or processing hardware/software), etc.

In step 1414, the acquired biometric data may be checked for consistency within the use case. For example, the new biometric data may be checked for anomalies the location that the sample was taken (e.g., a GPS location), for noise characteristics, lighting characteristics, etc.

In step 1416, a global consistency check may be performed. In one embodiment, the system may determine whether the different biometric profiles, the data within a profile, and the modalities in each data set are consistent with each other. In one embodiment, although there might be variation in different user profiles, these individual profiles or data in each profile cannot be inconsistent. A global consistency check performs a consistency check across different profiles as well as within each profile in each modalities. This may be different from regular consistency checks that occur within the modality, within the profile, etc.

In step 1418, a new profile may be created. In one embodiment, the algorithm that is associated with the profile, threshold specifications, etc. may be adjusted for the new profile.

Figure 15:
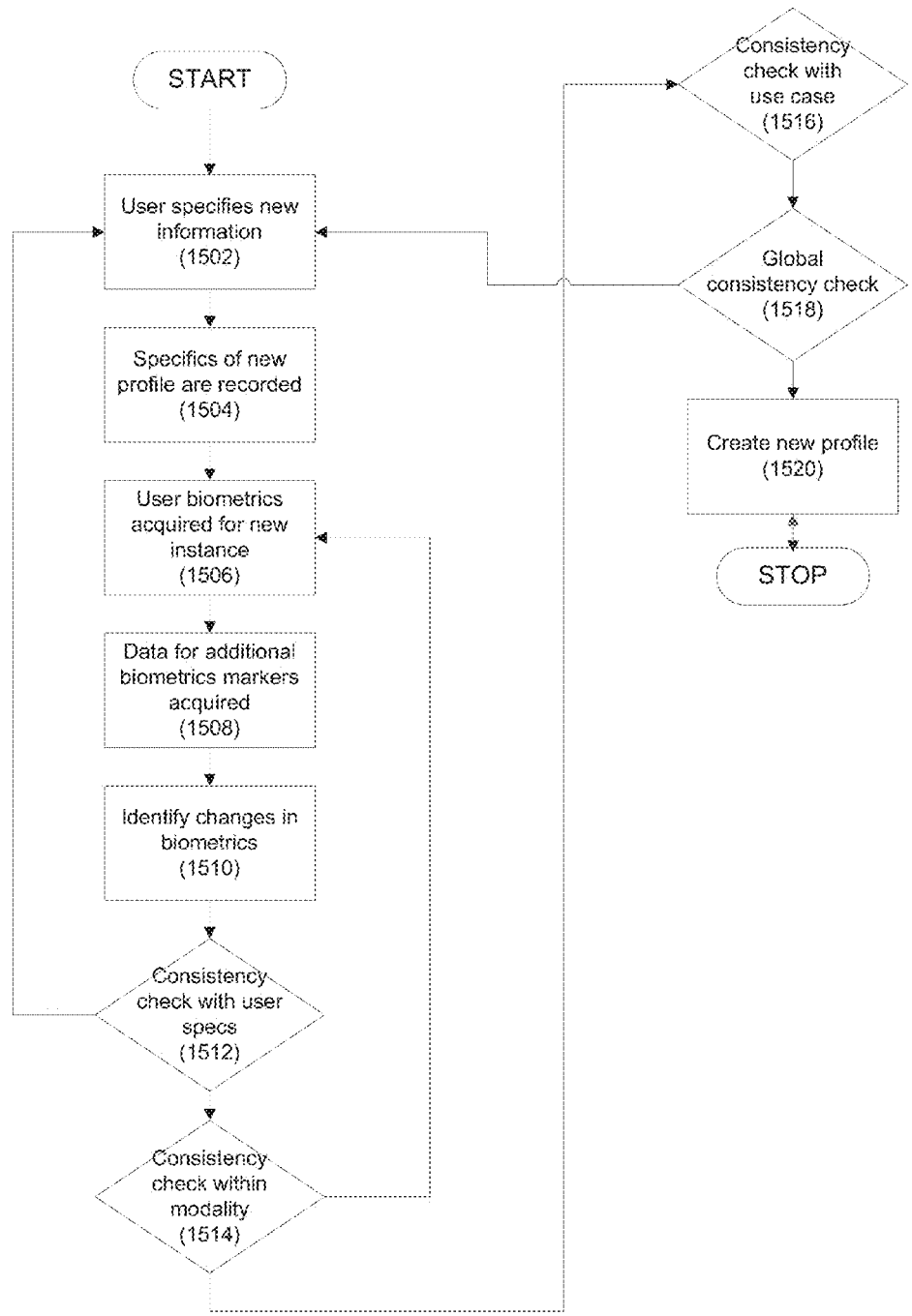
FIG. 15 is a flowchart depicting a method for manually generating a user profile according to one embodiment.

Referring to FIG. 15, a flowchart depicting a method for manually generating a user profile according to one embodiment is provided.

In step 1502, the user provides information on a new profile. In one embodiment, the user may specify the new biometrics data that will be provided (e.g., face, fingerprint, voice, etc.). and may specify the reason for the new biometric data (e.g., in response to face surgery, beard, glasses, etc.). In another embodiment, the user may also specify a new device and/or channel (e.g., a new smart phone, microphone, software on the smartphone, etc.). In still another embodiment, the user may specify a new use case (e.g., a new location, environment, surroundings, such a noisy environment, a well-lit environment, etc.). Any one or combination of these (e.g., a new facial biometric capture with a new device) or other specifics may be used as necessary and/or desired.

In step 1504, the specifics of the new profile may be recorded. In one embodiment, the user may specify alterations in biometric characteristics to be captured (e.g., wearing glasses, etc.), alterations in devices (e.g., different camera on device), different use cases (e.g., different noise levels, lighting levels, etc.). Other alterations may be specified as necessary and/or desired.

In step 1508, new existing data may be clustered. In one embodiment, existing data in nearest neighbor clusters for individual modalities may be clustered. The allowable variance between data in the clusters, and across different clusters, may be specified by, for example, a security policy. This may be similar to step 1404, above.

In step 1506, the new biometric data is captured. In one embodiment, the new biometric profile may be captured using a known device, a new device, etc.

In step 1508, data for additional biometrics markers may be acquired. In one embodiment, this data may be acquired for potential compensation. By acquiring additional and complementary biometrics data through the interactive session, the system may improve the confidence level of the user's identity as specified by biometrics data.

In step 1510, changes to the biometric data are identified for each modality. In one embodiment, any data that exceeds a predetermined threshold may be marked for additional review, notification, etc. In one embodiment, depending on the level of security threat, the marked biometrics session may be considered at the appropriate timeframe by the appropriate personnel, security screening apparatus, etc. For high security applications, such as banking, it is considered immediately Specialized biometrics kiosks may be used for additional screening/verification. In addition, out-of-band authentication may be initiated where password authentication and different acquisition channels may be used for biometrics.

In step 1512, the acquired biometric data may be checked for consistency within the modality. In one embodiment, a check is made to see if any unchanged markers are consistent. In another embodiment, a check is made to see if any changed markers are consistent with each other. This may be similar to step 1410, above.

In one embodiment, if inconsistencies are identified, the user may be asked to re-enter specifics for the new profile in step 1502.

In step 1514, the acquired biometric data may be checked for consistency within the channel and/or device. In one embodiment, a check may be made to determine if the new biometric data is consistent with an expected resolution for the capturing device (e.g., to verify the camera), sample rate for the capturing device (e.g., to verify the microphone and/or processing hardware/software), etc. This may be similar to step 1412, above.

If, in one embodiment, if consistencies are identified, biometric data may be recaptured in step 1506.

In step 1516, the acquired biometric data may be checked for consistency within the use case. For example, the new biometric data may be checked for anomalies the location that the sample was taken (e.g., a GPS location), for noise characteristics, lighting characteristics, etc. This may be similar to step 1414, above.

In step 1518, a global consistency check may be performed. This may be similar to step 1416, above.

In step 1520, a new profile may be created. In one embodiment, the algorithm that is associated with the profile, threshold specifics, etc. may be adjusted for the new profile.

Figure 16:
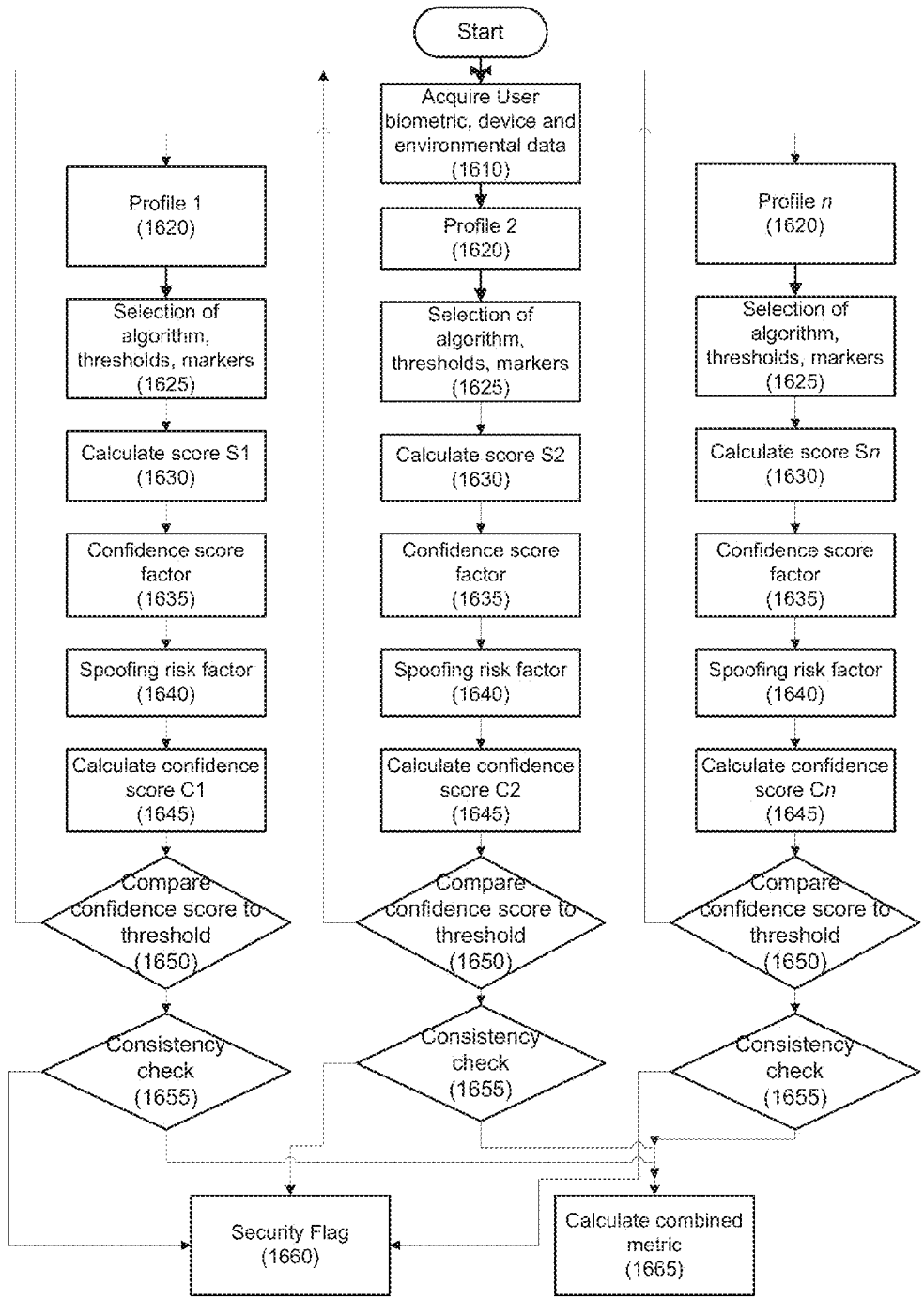
FIG. 16 is a flowchart depicting a method for high fidelity multi-modal out-of-band biometric authentication through vector-based multi-profile storage according to one embodiment.

Referring to FIG. 16, a flowchart depicting a method for high fidelity multi-modal out-of-band biometric authentication through vector-based multi-profile storage is provided.

In step 1610, the user's biometrics are acquired. This may be performed, for example, by the user's mobile device. In one embodiment, in addition to the biometrics, device information (e.g., type of device, specifications, etc.) may be acquired.

In one embodiment, environmental data (e.g., location information, time of day, lighting data, noise data, etc.) may be acquired. In one embodiment, different profiles or personas (e.g., office profile/persona, home profile/persona, travel profile/persona, etc.) may be used as necessary and/or desired. Examples of profiles or personas are disclosed in U.S. Provisional Patent Application Ser. No. 61/831,358, filed Jun. 5, 2013, and U.S. patent application Ser. No. 13/930,494 filed Jun. 28, 2013, the disclosures of which are incorporated by reference in their entireties.

In step 1620, a first profile is selected to compare to the acquired biometric data.

In step 1625, a customized set of algorithms, thresholds, and markers may be selected. In one embodiment, these may be selected based on the type of profile (e.g., facial recognition versus voice recognition), limitations on the devices (e.g. camera resolution, clarity, etc.), environmental factors (e.g., lighting, noise level, etc.).

In step 1630, a score ($S_i$) may be calculated for each of the n profiles.

In step 1635, a confidence score factor may be calculated for each of the n profiles.

In step 1640, a spoofing risk factor may be determined for each of the n profiles. In one embodiment, the spoofing risk factor may be based on the given modality, algorithm, and/or environmental factors.

In step 1645, a confidence score may be calculated for each for the n profiles.

In step 1650, the confidence score may be compared to the threshold. In one embodiment, if the confidence score exceeds a first threshold, then the method proceeds to step 1655. If the confidence score is between a first threshold and a second threshold, the acquisition process may be repeated. In one embodiment, a look up table that provides complementary markers and algorithms to improve the confidence score for the specific profile may be accessed. A new biometric acquisition process may collect data for these complementary markers. This interactive biometric acquisition process may iterate a number of times (i.e., k iterations) where k is higher for high security transactions.

If the confidence score is below the first and second threshold this may indicate that the acquired biometrics are so different from the profile that the person may not be a match. Biometrics data may be recaptured and additional biometrics information may be gathered depending on the security level of the application and characteristics of the captured data with respect to the specified thresholds.

In one embodiment, the confidence score is only one of several inputs that are considered. Thus, a high confidence score may not mean certain authentication.

Following the comparison, in step 1655, a consistency check may be performed. In one embodiment, the consistency checks may be similar to those described above.

If the consistency check is unsuccessful, in step 1660, a security flag (or similar indication) may be activated. In one embodiment, the profile may be flagged or marked. In another embodiment, the new data may be flagged or marked. In still another embodiment, both the profile and the new data may be flagged or marked. In one embodiment, the system may provide an alert or notification to the account owner, human security officer, etc. For example, the employee's management may be notified if the biometric authentication resulted in a transaction.

If the consistency check is successful, in step 1665 then the combined confidence metric may be calculated based on the vector of user profiles and their associated confidence scores C1 . . . Cn.

In one embodiment, the following equation may be used:

Metric: F((Coeff 1)*total confidence number, Coeff 2*(delta variation among confidence scores), Coeff3*(#confidence over Threshold)) where Metric M is a function of total confidence, delta variation among confidence scores, and confidence over threshold with customized coefficients.

Figure 17:
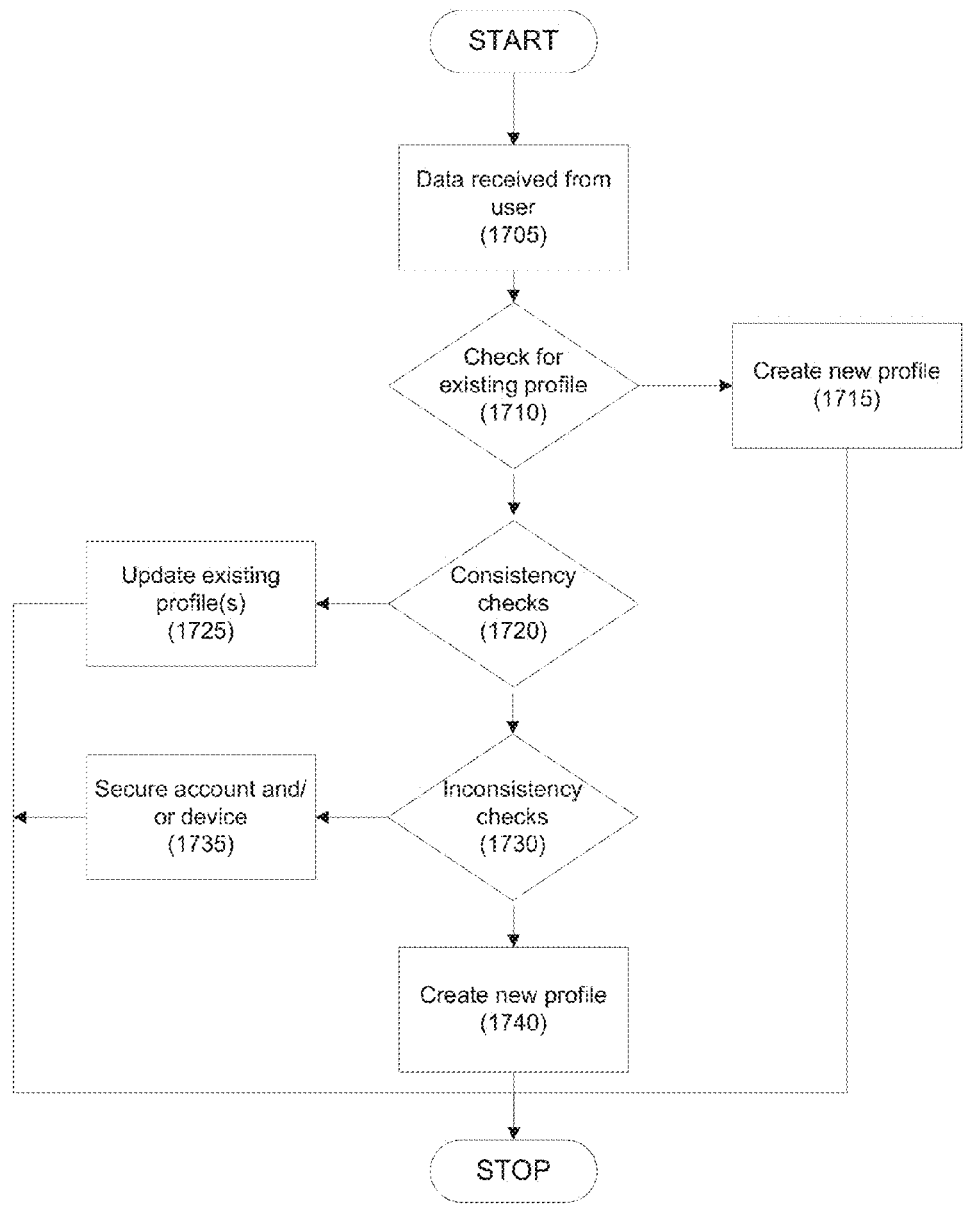
FIG. 17 is a flowchart depicting a method for the creation of multiple profiles for a user according to one embodiment.

Referring to FIG. 17, a method for the creation of multiple profiles for a user according to one embodiment is provided. In step 1705, data for the user may be received. In one embodiment, this data may include biometric data for the user (e.g., voice, facial, etc.) and may include device specifications for the device that is providing the data (e.g., device model, camera/microphone characteristics, etc.). Other data may be provided as is necessary and/or desired.

In one embodiment, the data may be provided as part of a registration step by the user. For example, this data may be provided by the user as part of a registration process.

In another embodiment, this data may be provided as part of an authorization attempt.

In still another embodiment, the user may be attempting to manually create a new profile. For example, the user may have just received a new style of glasses, and wants to create a new profile based on wearing the new glasses.

In step 1710, a check may be made to see if there is an existing profile for the user and/or device. In one embodiment, if there is no existing profile, indicating a new registration, in step 1715, the captured data may be used to create a profile for the user.

In step 1720, a check may be made to see if the new data is consistent with the existing profile(s). In one embodiment, consistency checks may be made with profiles that may be based on a biometric type or modality (e.g., facial, voice, etc.), a channel or device (e.g., iPhone, Galaxy, etc.), a use case (location, environment, surroundings, etc.), etc. In one embodiment, because some variation may be expected in these checks, the data may be deemed to be consistent if it is within a predetermined threshold. In another embodiment, an exact match may be required. Any other suitable method for determining consistency may be used as is necessary and/or desired.

In step 1725, if the data is deemed consistent with one of the profiles, in one embodiment, the existing profile may be updated to reflect the changes between the new data and the existing profile. In one embodiment, if the data is consistent with more than one existing profile, the existing profile that is closest (e.g., is the closest match) may be updated. In another embodiment, all existing profiles that are deemed to be consistent with the new data may be updated.

In another embodiment, the existing profiles may not be updated to reflect any differences.

If the data is not deemed to be consistent with any existing profiles, in step 1730, a check may be made to see if the data is inconsistent with the existing profiles. This may indicate that the user cannot be the same user that is stored in any of the existing profiles. In one embodiment, a comparison with a predetermined threshold may be used to determine if the new data is inconsistent. Any other suitable method for determining inconsistency may be used as is necessary and/or desired.

If the data is inconsistent, in step 1735, the account may be secured. In one embodiment, this may involve alerting an appropriate party, locking the account, locking the device, etc. Any other suitable security measure may be used as is necessary and/or desired.

If the data is not inconsistent, in step 1740, a new profile for the user may be created.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for automatically generating a biometric profile having a plurality of clusters for a user, comprising:
at least one computer processor accessing stored biometric data for a user;
the at least one computer processor grouping the stored biometric data related to a biometric characteristic into a plurality of clusters using nearest neighbor-based clustering, the stored biometric data within each cluster having a statistically significant correlation level;
the at least one computer processor checking the stored biometric data within each cluster for consistency; and
the at least one computer processor generating a biometric profile comprising the plurality of clusters for the user.

2. The method of claim 1, wherein each of the clusters comprises biometric data has a common feature.

3. The method of claim 1, wherein each cluster is associated with at least one biometric algorithm.

4. The method of claim 1, wherein each cluster is associated with an upper threshold and a lower threshold.

5. The method of claim 1, wherein the stored biometric data is checked for consistency within each cluster.

6. The method of claim 5, wherein the stored biometric data is checked for consistency with at least other biometric data points within a predetermined threshold.

7. The method of claim 1, wherein the stored biometric data is checked for consistency within a predetermined threshold that is based on a security level.

8. The method of claim 1, wherein the stored biometric data is checked for consistency within the profile.

9. The method of claim 1, wherein the stored biometric data is checked for consistency across a plurality of profiles for the user.

10. The method of claim 1, wherein each cluster is associated with a modality.

11. The method of claim 1, wherein each cluster is associated with a channel.

12. The method of claim 1, wherein each cluster is associated with a use case.

13. The method of claim 1, wherein the stored biometric data is checked for global consistency.

14. The method of claim 1, wherein a security interrupt/flag is raised if an inconsistency is identified.

15. The method of claim 1, further comprising:
the at least one computer processor acquiring new biometric data for the user;
the at least one computer processor using nearest neighbor-based clustering to identify one of the clusters to store the new biometric data in; and
the at least one computer processor generating an updated biometric profile comprising the plurality of clusters based on the new biometric data.

16. The method of claim 1, further comprising:
the at least one computer processor acquiring new biometric data for the user;
the at least one computer processor using nearest neighbor-based clustering to determine that a new cluster is needed for the new biometric data;
the at least one computer processor storing the new biometric data in the new cluster; and
the at least one computer processor generating an updated biometric profile comprising the plurality of clusters and the new cluster.

17. The method of claim 1, further comprising:
receiving the biometric data during at least one authentication attempt.

18. A method for generating a biometric profile for a user, comprising:
receiving data from a user, the data comprising biometric data for the user and device specifications for an electronic device;
at least one computer processor normalizing the received biometric data for the user based on the device specifications;

the at least one computer processor retrieving a profile for the user, the profile comprising a plurality of clusters related to a biometric characteristic, each cluster storing biometric data that has a statistically significant correlation level;

the at least one computer processor using nearest neighbor-based clustering to identify one of the clusters with stored biometric data that is consistent with the normalized biometric data; and the at least one computer processor updating the identified cluster based on the normalized biometric data.

19. The method of claim 18, wherein the received biometric data is at least one of a voice biometric, an image biometric, a device specification, and a use case.

20. The method of claim 18, wherein the step of identifying one of the clusters with stored biometric data that is consistent with the normalized biometric data comprises:

comparing the normalized biometric data and the stored biometric data in the identified cluster to a predetermined threshold.

21. The method of claim 20, wherein the predetermined threshold is based on at least one of a transaction risk and a user status.

22. The method of claim 18, further comprising:

the at least one computer processor determining that the data is inconsistent with the profile;

the at least one computer processor creating a new profile comprising the received normalized biometric data.

* * * * *